US006798897B1

(12) United States Patent
Rosenberg

(10) Patent No.: US 6,798,897 B1
(45) Date of Patent: Sep. 28, 2004

(54) REAL TIME IMAGE REGISTRATION, MOTION DETECTION AND BACKGROUND REPLACEMENT USING DISCRETE LOCAL MOTION ESTIMATION

(75) Inventor: Yoav Rosenberg, Jerusalem (IL)

(73) Assignee: Protrack Ltd., Rehovot (IL)

( * ) Notice: Subject to any disclaimer, the term of this patent is extended or adjusted under 35 U.S.C. 154(b) by 497 days.

(21) Appl. No.: 09/654,679

(22) Filed: Sep. 5, 2000

Related U.S. Application Data

(60) Provisional application No. 60/153,984, filed on Sep. 5, 1999, and provisional application No. 60/153,982, filed on Sep. 15, 1999.

(51) Int. Cl.$^7$ .................................................. G06K 9/00
(52) U.S. Cl. ........................ 382/107; 348/154; 382/294; 382/254
(58) Field of Search ................................ 382/100, 154, 382/107, 181, 151, 109, 103, 106, 284, 276, 309, 254, 232, 294; 348/586, 552, 44, 38, 51, 558, 559, 565, 154, 587; 356/27, 28, 29, 34; 352/46; 600/532

(56) References Cited

U.S. PATENT DOCUMENTS

| | | | | | |
|---|---|---|---|---|---|
| 4,968,132 | A | * | 11/1990 | Ferren ........................... | 352/46 |
| 5,249,039 | A | * | 9/1993 | Chaplin ........................ | 348/587 |
| 5,530,774 | A | * | 6/1996 | Fogel ........................... | 382/154 |
| 5,764,306 | A | * | 6/1998 | Steffano ....................... | 348/586 |
| 5,800,360 | A | * | 9/1998 | Kisner et al. ................. | 600/532 |
| 6,075,905 | A | * | 6/2000 | Herman et al. ............... | 392/284 |
| 6,252,974 | B1 | * | 6/2001 | Martens et al. .............. | 382/107 |

OTHER PUBLICATIONS

L. Y. Wei, M. Levoy, "Fast Texture Synthesis using Tree–Structured Vector Quantization", *SIGGRAPH* Aug. 30, 2000, 10 pages.

M. Irani et al., "Computing Occluding and Transparent Motions", *IJCV* 12(1), Feb. 1994, pp. 5–15.

P.J. Burt and E.H. Adelson, "A Multiresolution Spline with Application to Image Mosaics", *ACM Transactions on Graphics*, 2(4), Oct. 1983, pp. 217–236.

(List continued on next page.)

*Primary Examiner*—Bhavesh M. Mehta
*Assistant Examiner*—Seyed Azarian
(74) *Attorney, Agent, or Firm*—Ladas & Parry

(57) ABSTRACT

A method for registration between first and second images, the method including defining, for each individual location from among a plurality of locations sparsely distributed over the first image, a local probability matrix in which each element represents the probability of a possible displacement between the individual location in the first image and its corresponding location within the second image, defining a combined probability matrix by combining corresponding elements over the plurality of probability matrices, and computing an alignment of the first and second images in accordance with a combination of at least one of the largest of the elements of the combined probability matrix; and further, a method for detecting motion within a scene including at least one moving objects by comparing first and second time-separated images of the scene, the method comprising defining, for each individual location from among a plurality of locations distributed over the first image, a local probability matrix in which each element represents the probability of a possible displacement between said individual location in the first image, representing an individual portion of the scene in the first image, and its corresponding location within the second image, and ranking the local probability matrices into a plurality of ranks of matrices, differing in the probability that the individual location corresponding to a matrix belonging to a rank was displaced between the first and second images, relative to what is known regarding camera motion between the first and second images.

22 Claims, 20 Drawing Sheets

OTHER PUBLICATIONS

F.I. Parke, K. Waters, *"Computer Facial Animation"*, K. Peters Ltd., 1996, pp. v–xii.

N. Magnenat–Thalmann and D. Thalmann, *"Computer Animation Theory and Practice"*, Springer–Verlag, Tokyo, 1985, pp. xi–xiii.

G. Healey, "Segmenting Images Uing Normalized Color", *SMC* 22(1), Jan. 1992, pp. 64–72.

W.B. Thompson, "Combining Motion and Contrast for Segmentation", *PAMI* 2(6), Nov. 1980, pp. 543–549.

T.R. Reed et al., "Texture Segmentation Using a Diffusion Region Growing Technique", *PR* 23 (9), Sep. 1990, pp. 953–960.

Chun S. Lu et al., "Unsupervised Texture Segmentation via Wavelet Transform", *Pattern Recognition* 30(5), May 1997, pp. 729–742.

D.D. Morris, J.M. Rehg, "Singularity Analysis for Articulated Object Tracking", *CVPR* 98, pp. 289–296.

Y. Rosenberg, M. Werman, "Representing Local Motion as a Probability Distribution Matrix and Object Tracking", May 1997, 5 pages.

H. Rowley, J.M. Rehg, "Analyzing Articulated Motion using Expectation–Maximization", *CVPR* 97, pp. 935–940.

J. Canny, "A Computational Approach to Edge Detection", *PAMI* 8(6), Dec. 1986, pp. 679–698.

I. Matals et al., "Edge Detection and Curve Enhancement using the Facet Model and Parametrized Relaxation Labelling", *IAPR* 94, pp. 1–5.

Y. Bar–Shalom, T.E. Fortmann, *Tracking and Data Association,* Academic Press, Inc. 1988, pp. vii–viii, x.

M. Irani et al., "Recovery of Ego–Motion Using Region Alignment", *PAMI* 19(3), Mar. 1997, pp. 268–272.

B. Rousso, E. Shilat, "Varying Focal Length Self–Calibration and Pose Estimation from Two Images", *CVPR* 98, pp. 469–474.

M. Pollefeys et al., "Self Calibration and Metric Reconstruction in Spite of Varying and Unknown Internal Camera Parameters", *ICCV* 98, pp. 90–95.

J.D. Foley et al., *Fundamentals of Interactive Computer Graphics,* 2nd Edition, Addison–Wesley Publishing, 1990, pp. xvii–xxii.

Yoav Rosenberg, Michael Werman, "Real–Time Object Tracking from a Moving Video Camera: A Software Approach on a PC", *IEEE Workshop on Applications of Computer Vision,* Princeton, Oct. 1998, 2 pages.

Yoav Rosenberg, "Tracking a Moving Object Using a Video Camera", The Hebrew University of Jerusalem, Dec. 1995, pp. 1–56.

P. Anandan, "A Computational Framework and an Algorithm for the Measurement of Visual Motion", *Int. J. of Computer Vision* 2, 1989, pp. 283–310.

H.S. Sawhney and R. Kumar, "True Multi Image Alignment and its Application to Mosacicing and Lens Correction", *Computer Vision and Pattern Recognition,* 1997, pp. 450–456.

E. Shilat, M. Werman and Y. Gdalyahu, "Ridge's Corner Detection and Correspondence", *Computer Vision and Pattern Recognition,* 1997, pp. 976–981.

H. Wang and M. Brady, "Real–Time Corner Detection Algorithm for Motion Estimation", *Image and Vision Computing* 13(9), Nov. 1995, pp. 695–703.

P. J. Burt, "Smart Sensing within a Pyramid Vision Machine", *Proceedings of the IEEE,* vol. 76, No. 8, Aug. 1998, pp. 1010–1014.

M. Ben–Ezra, S. Peleg and M. Werman, "Efficient Computation of the Most Probable Motion from Fuzzy Correspondences", *Workshop on Application of Computer Vision,* 1998, 6 pages.

\* cited by examiner

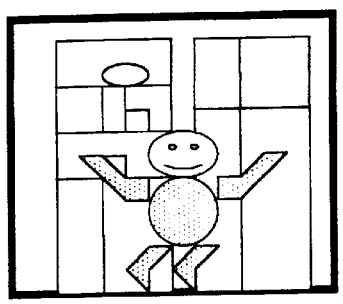 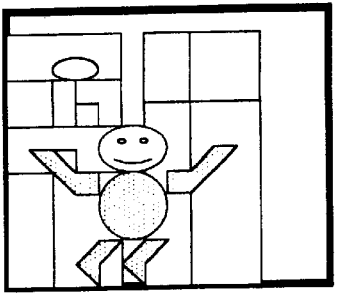 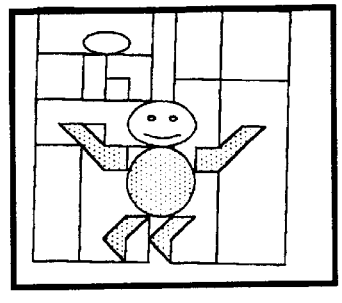
Fig 18A　　　　　Fig 18B　　　　　Fig 18C
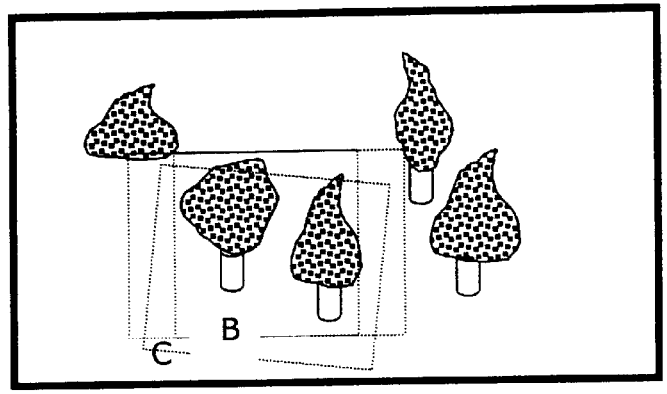
Fig 18D

REAL TIME IMAGE REGISTRATION, MOTION DETECTION AND BACKGROUND REPLACEMENT USING DISCRETE LOCAL MOTION ESTIMATION

This application claims the benefit of Provisional application Ser. Nos. 60/153,984, filed Sep. 5, 1999, and 60/153,982, filed Sep. 15, 1999.

FIELD OF THE INVENTION

The present invention relates to apparatus and methods for registration, motion detection, tracking and background replacement.

BACKGROUND OF THE INVENTION

The state of the art is believed to be represented by the following publications:

H. S. Sawhney and R. Kumar. True Multi Image Alignment and its Application to Mosaicing and Lens Distortion. In Computer Vision and Pattern Recognition, pages 450–456, 1997;

P. Anandan. A Computational Framework and an Algorithm for the Measurement of Visual Motion. Int. J. of Computer Vision 2, pages 283–310, 1989;

M. Irani, B. Rousso and S. Peleg. Computing Occluding and Transparent Motions. Int. J. of Computer Vision, 12 No. 2, pages 5–16, January 1994;

E. Shilat, M. Werman and Y. Gdalyahu, Ridges' Corner Detection and Correspondence. In Computer Vision and Pattern Recognition, pages 976–981, 1997;

H. Wang and M. Brady. Real-Time Cornet Detection Algorithm for Motion Estimation. Image and Vision Computing 13 No. 9, pages 695–703, 1995;

Y. Rosenberg and M. Werman. Representing Local Motion as a Probability Matrix and Object Tracking. In Darpa Image Understanding Work Shop, pages 153–158, 1997;

M. Ben-Ezra, S. Peleg and M. Werman. Efficient Computation of the Most Probable Motion from Fuzzy Correspondences. Workshop on Application of Computer Vision, 1998;

M. Irani and P. Ananda, "Robust multi-sensor mage alignment", Proceedings of International Conference on Computer Vision, January 1998.

"Blue-screen" background replacement is known.

U.S. Pat. No. 5,764,306 to Steffano describes a real time method of digitally altering a video data stream to remove portions of the original image and substitute elements to create a new image. Steffano describes real time replacement of the designated background portion of an incoming video signal with an alternate background. The actual background image is utilized for reference as the basis for determining the background and foreground elements within the image with the end result being comparable to traditional blue-screen processes, but requiring only a personal computer, video camera and software. The reference background image can be any reasonably static scene with a sufficient and stable light source captured by the camera. The video data stream is modified in real time by comparisons against the reference background image and is then passed on to its original destination. Multiple signal-noise processing algorithms are applied in real time against the signal to achieve a visually acceptable matte.

The disclosures of all publications mentioned in the specification and of the publications cited therein are hereby incorporated by reference.

SUMMARY OF THE INVENTION

The present invention seeks to provide a fast and robust method for image registration and motion detection based on discrete representation of the local motion. This allows the implementation of a real-time system on a PC computer which can register images and detect and track a moving object in video images, even when the camera is moving.

There is thus provided, in accordance with a preferred embodiment of the present invention, a method for registration between first and second images, the method including defining, for each individual location from among a plurality of locations sparsely distributed over the first image, a local probability matrix in which each element represents the probability of a possible displacement between he individual location in the first image and its corresponding location within the second image, defining a combined probability matrix by combining corresponding elements over the plurality of probability matrices, and computing an alignment of the first and second images in accordance with a combination of at least one of the largest of the elements of the combined probability matrix.

The above method is particularly suitable for applications in which the images can be assumed to be translated only relative to one another.

Further in accordance with a preferred embodiment of the present invention, the corresponding elements which are combined in the combined probability matrix defining step include elements within the local probability matrices which are similarly positioned if each individual local probability matrix is shifted to represent the effect on the individual location corresponding to the individual matrix, of a particular non-translational transformation between the first and second images.

The above method is particularly suitable for applications in which the images may be translated relative to one another and might be additionally rotated to a certain typically estimable extent.

Still further in accordance with a preferred embodiment of the present invention, the method also includes repeating the combined probability matrix defining step for each of a plurality of possible non-translational transformations between the first and second images, and selecting at least one most likely non-translational transformation from among the plurality of possible non-translational transformations, and the step of computing an alignment includes computing a relative non-translational transformation of the first and second images by computing a combination of the at least one most likely non-translational transformation, and computing a relative translation of the first and second images by computing a combination of at least one of the largest of the elements of the at least one combined probability matrices of the at least one most likely non-translational transformations.

Further in accordance with a preferred embodiment of the present invention, the step of selecting at least one most likely non-translational transformations from among the plurality of possible non-translational transformations includes comparing a set of at least one of the largest of the elements in each of the combined probability matrices of each of the plurality of possible non-translational transformations, selecting at least one set from among the compared sets whose members are largest, and selecting as most likely non-translational transformations, the at least one non-translational transformation corresponding to the at least one set whose members are largest.

Still further in accordance with a preferred embodiment of the present invention, the probability matrix is characterized in that each i,j element therewithin represents the probabilities that the individual point corresponds to an individual point in the second image, which is displaced correspondingly to the displacement of the i,j element from the center of the probability matrix.

Further in accordance with a preferred embodiment of the present invention, the corresponding elements which are combined include similarly positioned elements within the local probability matrices.

Still further in accordance with a preferred embodiment of the present invention, the method also includes executing the alignment.

Additionally in accordance with a preferred embodiment of the present invention, the method also includes executing the alignment by effecting the relative non-translational transformation and the relative translation of the first and second images.

Still further in accordance with a preferred embodiment of the present invention, the plurality of possible non-translational transformations between the first and second images includes at least one relative rotation between the first and second images.

Additionally in accordance with a preferred embodiment of the present invention, the plurality of possible non-translational transformations between the first and second images includes at least one relative zoom between the first and second images.

Further in accordance with a preferred embodiment of the present invention, the plurality of possible non-translational transformations between the first and second images includes at least one transformation which includes a combination of zoom and rotation between the first and second images.

Still further in accordance with a preferred embodiment of the present invention, the plurality of possible non-translational transformations between the first and second images includes at least one affine transformation between the first and second images.

Also provided, in accordance with another preferred embodiment of the present invention, is a method for detecting motion within a scene by comparing first and second time-separated images of the scene, the method including defining, for each individual location from among a plurality of locations distributed over the first image, defining a local probability matrix in which each element represents the probability of a possible displacement between the individual location in the first image, representing an individual portion of the scene in the first image, and its corresponding location within the second image, and ranking the local probability matrices into a plurality of ranks of matrices, differing in the probability that the individual location corresponding to a matrix belonging to a rank was displaced between the first and second images, relative to what is known regarding camera motion between the first and second images.

The above method is particularly suited for applications in which the camera is assumed stationary.

Further in accordance with a preferred embodiment of the present invention, the ranking step includes comparing the center region of each local probability matrix to the peripheral regions thereof.

Still further in accordance with a preferred embodiment of the present invention, the ranking step includes constructing a combined probability matrix in which each element represents the probability of a possible camera motion-caused displacement between the first image and the second image, and ranking the local probability matrices in accordance with the degree to which they respectively resemble the combined probability matrix.

The above method is particularly suited to applications in which the camera cannot be assumed to be stationary.

Further in accordance with a preferred embodiment of the present invention, the method also includes deriving the second image from a third image of the scene, separated in time from the first image of the scene, including selecting a transformation which, when applied to the third image, results in an image aligned generally to the first image, in the sense that the two images, if not totally aligned, can be brought into alignment by applying a translation, and applying the transformation to the third image, thereby to derive the second image.

Still further in accordance with a preferred embodiment of the present invention, the transformation has a non-translational component. Additionally in accordance with a preferred embodiment of the present invention, the transformation having a non-translational component is a non-translational transformation.

Also provided, in accordance with another preferred embodiment of the present invention, is a system for registration between first and second images, the system including a local probability matrix generator operative to define, for each individual location from among a plurality of locations sparsely distributed over the first image, a local probability matrix in which each element represents the probability of a possible displacement between said individual location in the first image and its corresponding location within the second image, a combined probability matrix generator defining a combined probability matrix by combining corresponding elements over the plurality of probability matrices, and an image aligner computing an alignment of the first and second images in accordance with a combination of at least one of the largest of the elements of the combined probability matrix.

Also provided, in accordance with another preferred embodiment of the present invention, is a system for detecting motion within a scene including at least one moving objects by comparing first and second time-separated images of the scene, the system including a local probability matrix generator defining, for each individual location from among a plurality of locations distributed over the first image, a local probability matrix in which each element represents the probability of a possible displacement between said individual location in the first image, representing an individual portion of the scene in the first image, and its corresponding location within the second image, and a location displacement evaluation unit operative to rank the local probability matrices into a plurality of ranks of matrices, differing in the probability that the individual location corresponding to a matrix belonging to a ran, was displaced between the first and second images, relative to what is known regarding camera motion between the first and second images.

The present invention also seeks to provide preferred methods and systems for replacing background in a movie of a subject in front of an arbitrary background, in applications including but not limited to videoconferencing, Internet chats, videophone and teaching.

Many applications, from videoconferencing to videophone transmit a video of a speaker in front of a background. These applications can benefit from the ability to change the background and transmit a different one in order to hide the original background, to create a desired illusion or just for variety (mainly for Internet chats).

A background replacement is used in virtual studios used for the television and movies industries, where special screens, with a typical color, are used as the original background (to be replaced). This document discusses a real-time replacement of a given uncontrolled background with a new one. Each of the subscribers taking part in a conversation can choose to change her/his background.

A background replacement system, according to a preferred embodiment of the present invention, receives a movie of a subject in front of a background, and creates, in real time, a new sequence in which the subject is unchanged and a new background that was pre-chosen by the user replaces the original one. The new background can be static or a dynamic one.

Background replacement typically includes the following steps:
I. Creating an alternative background as desired. This new, static or dynamic, background is transmitted only once.
II. ((For each frame in the movie) Separating the subject from the original background.
III. (For each frame in the movie) Blending the subject with the new background. Separating the subject from the original background is done for each frame. An insufficient separation might cause artifacts such as leaving parts of the original background around the subject or replacing parts of the subject by the new background. The new background is created and transmitted only once. For each frame, only the subject and the camera motion are transmitted. Inserting the subject to a background frame typically takes into account the camera motion: The camera motion causes background motion that is typically applied to the virtual background. For example, the system of the present invention may be operative to accommodate a camera's rotation around any rotation axis.

Described herein are possible methods for an alternative background creation and real-time background replacement. Including alternative background creation, the process of separating the subject from the background and the blending of the subject with the new, virtual background. The system operation preferably includes the following steps: creating the virtual background and transmitting it, marking the subject in the first frame, either manually or by using some automatic criteria, and performing the following operations for each frame: detecting the background motion and transmitting it, tracking the subject in the current frame and transmitting the subject and blending the subject into the new background, typically performed by the receiver.

Creating an Alternative Background

There are several approaches for the alternative background creation. One possible method is to use a given image or movie. Another alternative is to create a virtual 3-D environment on which the image (movie) is projected as a texture. The software typically provides the tools for the virtual 3-D world construction and for the texture mapping (static or dynamic texture). This possibility requires more user work, but typically enables complex virtual backgrounds and free camera motion.

The above Possibilities require images and/or movies. One can use ready-made images (movies) or obtaining synthetic ones using a texture generator. A texture's generator learns the statistics and/or structure of a given texture from an image or from a sequence of images and generates new images of the same type. The same approach can be implied on movies, as described e g. in L.-Y. Wei, M. Levoy, "Fast texture synthesis using tree-structured vector quantization", SIGGRAPH 30-08-2000. Using the generator causes variegation of a specific type images e.g. waterfalls or forest images. Since the generator learns mainly statistics it is especially useful for natural phenomenon.

For broadcasting, virtual background is typically transmitted only once. The location of the subject in the background and the location of the first image in the virtual background is typically set in advance. This location changes with the motion of the physical camera.

Separating the Subject from the Original Background

The system preferably has the ability to cut the subject from the original movie, and reliably paste and blend it with, the new background. Cutting the subject relies on the ability to identify and track it along the image sequence.

An initial denoting of the subject can be done manually (e.g. using the computer's mouse) or automatically, using some criteria. We use motion detection and manual marking, but other criteria are possible. Using motion detection is to assume that the subject moves before the transmission starts to enable the system's identification. Separating a moving subject from the original background is done using a motion tracker that identifies the location and the shape of the subject in each frame. Using motion as subject identification is not equivalent to assuming that the subject moves in all frames. After the subject moves once, the system can detect its location in each frame, even if it does not move any longer.

For a moving camera, the motion of the background is accurately computed. Any inaccuracies result in a "floating" subject in front of the new background. There are many methods to compute the background motion, e.g. the method described in Rosenberg, Y. and Werman, M. "Real-time object tracking from a moving video camera: a software approach on a PC", IEEE Workshop on Applications of Computer Vision, Princeton, Oct. 1998, pp. 238–239. The Rosenberg-Werman method is particularly suited for rotating camera applications." The Rosenberg-Werman reference refers to real-time motion detection, tracking and background motion computation using a standard PC although analysis of the background motion is limited to scenes that contain enough information (the system would not recognize a rotation of the camera for a subject in front of a smooth and empty wall). The methods described assume that most of each frame is the background.

Videoconference applications typically do not transmit the entire original frame: only the subject, its location in the image and the camera motion (background motion) parameters are typically transmitted. The location of the subject in the virtual frame can be set in a pre-defined location (e.g. in the enter) or according to its location in the original frame.

Blending the Subject with the Virtual Background

Inserting the subject into the new movie involves placing the subject relative to the background and naturally blending the subject with the background.

Real camera motion implies a background motion that typically leads to the same motion of the virtual background. The accuracy of the motion estimation is crucial to the reliability of the result. A wrong motion of the virtual background causes the subject "to float" in front of the background. We use the method described in the above-referenced Rosenberg-Werman publication to accurately compute the background motion, but other methods are possible.

The system places the subject in each frame relative to its location in the original frame. It is possible, for a static camera, to place the subject in a fix location (e.g. always in the center of the frame).

Blending the subject with the background should look natural and should preferably overcome possible errors in cutting the subject from the original frame, as described e.g. in Burt and Adelson, "A multiresolution spline with application to image mosaics", ACM Transactions on Graphics, 2(4), pp. 217–236, October 1983.

There is thus provided, in accordance with a preferred embodiment of the present invention, a background replacement method and system for processing an image sequence representing a scenario having a first portion to be replaced and a second moving portion, at least a portion of whose motion is to be retained, the method including providing a first image including a first portion to be replaced and a second moving portion, providing a distinction between the first and second portions, and providing a new image in which at least a portion of the motion of the second portion is retained and the first portion is replaced with new image content.

Further in accordance with a preferred embodiment of the present invention, the method and system also include providing a second image in the image sequence and repeating the distinction providing and new image providing steps for the second image.

Still further in accordance with a preferred embodiment of the present invention, the distinction between the first and second portions of the second image is provided by tracking the second portion from at least the first image to the second image, e.g. by comparing several images in the vicinity of the first image in order to track from the first image to the second image.

Additionally in accordance with a preferred embodiment of the present invention, the first portion in the second image is defined as all portions of the second image which are not included in the second portion of the second image, tracked from the second portion of the first image.

Still further in accordance with a preferred embodiment of the present invention, the second moving portion includes a portion of the image having at least one subportion which moves in at least one portion of the scenario.

Further in accordance with a preferred embodiment of the present invention, the new image providing step includes transmitting the new image to a remote location and/or displaying the new image.

Further in accordance with a preferred embodiment of the present invention, the step of providing a distinction includes receiving a user's indication of the location of the second portion in the first image.

Still further in accordance with a preferred embodiment of the present invention, the method and system also include automatically improving the user's indication of the location of the second portion.

Further in accordance with a preferred embodiment of the present invention, the step of automatically improving includes automatically searching for the second portion, adjacent the user's indication of the location of the second portion, in accordance with a distinguishing criterion distinguishing between the first and second portions.

Still further in accordance with a preferred embodiment of the present invention, the step of providing a distinction includes automatically distinguishing the second portion from the first portion in accordance with a distinguishing criterion distinguishing between the first and second portions.

Still further in accordance with a preferred embodiment of the present invention, the distinguishing criterion includes a color criterion.

Additionally in accordance with a preferred embodiment of the present invention, the distinguishing criterion includes a motion criterion.

Still further in accordance with a preferred embodiment of the present invention, the distinguishing criterion includes a textural criterion.

Further In accordance with a preferred embodiment of the present invention, the automatic searching step includes detecting edges adjacent the location of the second portion as indicated by the user.

Still further in accordance with a preferred embodiment of the present invention, the automatic searching step includes detecting a contour adjacent the location of the second portion as indicated by the user.

Additionally in accordance with a preferred embodiment of the present invention, the steps of providing the first and second images respectively include employing a moving e.g. pivoting camera to generate the first and second images.

Still further in accordance with a preferred embodiment of the present invention, the step of providing a new image includes the steps of estimating motion parameters of the moving camera quantifying motion of the moving camera between the first and second images, providing first new image content for the first image, and generating second new image content for the second image by applying the motion parameters to the first new image content.

Also provided, in accordance with another preferred embodiment of the present invention, is a background replacement system for processing an image sequence representing a scenario having a first portion to be replaced and a second moving portion, at least a portion of whose motion is to be retained, the system including an image source providing a first image including a first portion to be replaced and a second moving portion, an image analyzer providing a distinction between the first and second portions, and an image replacer providing a new image in which at least a portion of the motion of the second portion s retained and the first portion is replaced with new image content.

Replacing the second portion can be performed by tracking the motion of the face and limbs and inducing their motion to the replacement of the second portion. The replacement content is preferably prepared in advance and has motion parameters corresponding to the model of the original object. Having corresponding parameters need not require having the same number of limbs. Instead, for example, logical rules can be formulated to establish a correspondence between motion of one specific limb in the image content being replaced, and between motion of several limbs in the replacing image content.

A suitable method for tracking and animating of facial features is described in F. I. Parke, K. Waters, *Computer facial animation*, A. K. Peters Ltd., 1996. Methods for tracking of humans and animating of human and human-like creatures is described in chapters 9 and 10 and elsewhere of N. Magnenat-Thalmann and D. Thalmann, *Computer animation theory and practice*, Springer-Verlag, Tokyo, 1985.

BRIEF DESCRIPTION OF THE DRAWINGS

The present invention will be understood and appreciated from the following detailed description, taken in conjunction with the drawings in which:

FIGS. 18A, 18B and 18C illustrate a stationary figure appearing on a stationary background, the figure and background being imaged by a pivoting camera pivoting from azimuthal positions A to B to C respectively;

FIG. 18D is a background panorama from which is to be derived new background content to replace the backgrounds of FIGS. 18A, 18B and 18C;

DETAILED DESCRIPTION OF PREFERRED EMBODIMENTS

Figure 1:
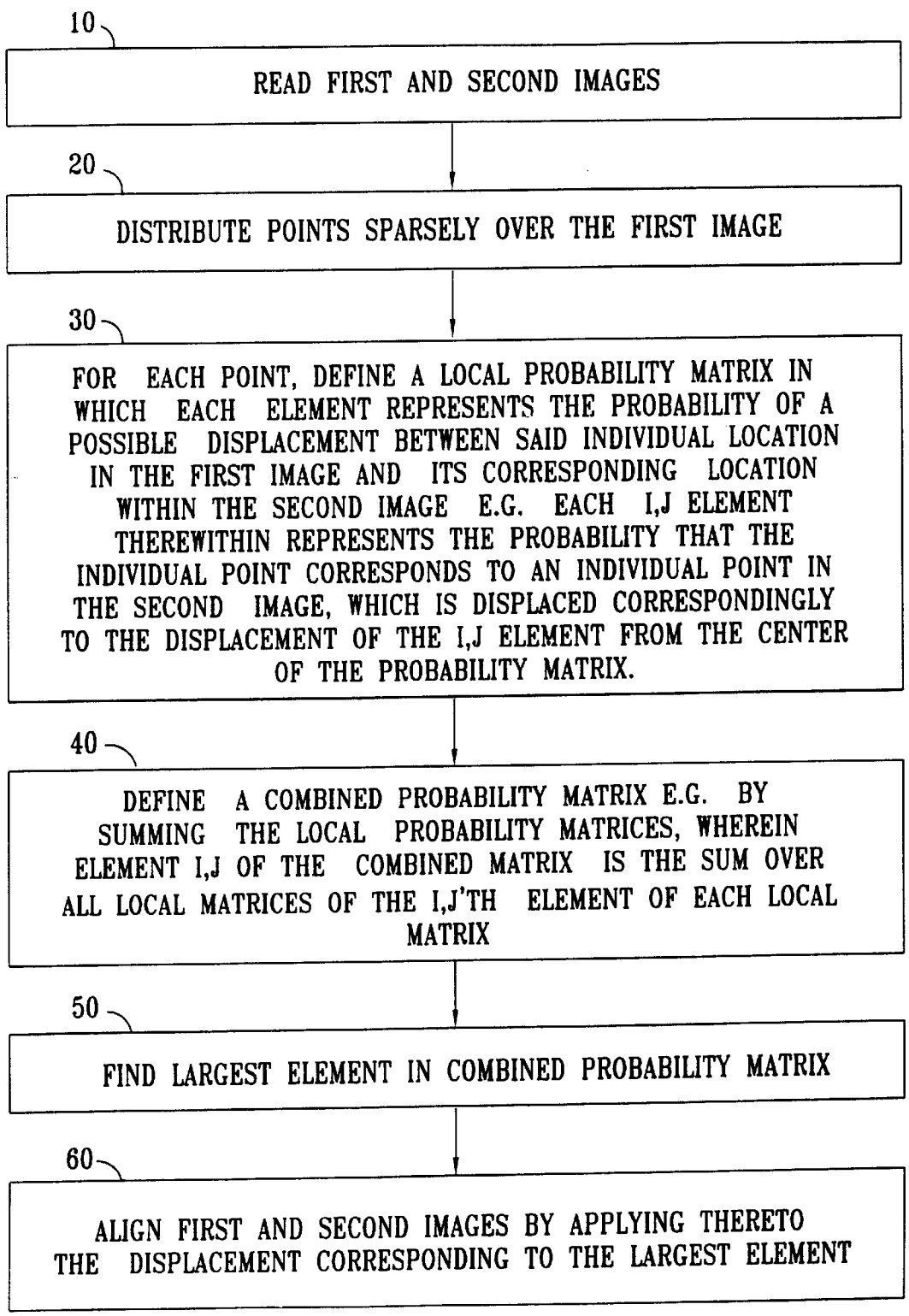
FIG. 1 is a simplified flowchart illustration of a preferred method for aligning two images whose misalignment occurred as a result of a physical process causing linear displacement.

Many computer vision applications require the ability to detect motion and track moving objects. Motion detection using a moving camera is usually a two-phase process: First compute the camera motion (registration) and then, after the background motion is Known, detect the moving objects. The registration phase alone is useful standalone for many other applications, such as camera stabilization and panoramic view construction.

The motion of an image point between two video frames depends on the camera motion, and when the camera is translated, it depends also on the distance of the object. Usually, simplified models are used to describe the motion in the image, ignoring the influence of the depth. There are some possible approximations, differing in their complexity. A simpler model implies stricter assumptions, but also faster and more robust model computation. The best is to use the simplest model that can satisfy the application's requirements such as the Swahney and Kumar 1997 model described in the following reference:

H. S. Sawhney and R. Kumar. True Multi Image Alignment and its Application to Mosaicing and Lens Distortion. In Computer Vision and Pattern Recognition, pages 450–456, 1997.

The computation of a motion model is based on the local motion estimation of a set of pixels (the set can include all the image's pixels, or a small set). Conventional methods usually use one of the two following approaches to compute the motion model based on the local motion:

A. Using intensity changes (in space and in time) all over the image. These methods become significantly slower as the size of the image increases, (although they use pyramids for acceleration), and are sensitive to camera noise. These methods are described in the following references:

H. S. Sawhney and R. Kumar. True Multi Image Alignment and its Application to Mosaicing and Lens Distortion. In Computer Vision and Pattern Recognition, pages 450–456, 1997;

P. Anandan. A Computational Framework and an Algorithm for the Measurement of Visual Motion. Int. J. of Computer Vision 2, pages 283–310, 1989; and M. Irani, B. Rousso and S. Peleg. Computing Occluding and Transparent Motions. Int. J. of Computer Vision, 12 No. 2, pages 5–16, January 94.

B. Using an initial step of feature detection, and finding the corresponding features in the second image. The features may be corners or other features that are relatively reliable to match. Feature detection may be time consuming and difficult task. Some images do not contain enough features of the desired type to enable a reliable correspondence. Noisy images often cause wrong correspondences as described in the following references:

E. Shilat, M. Werman and Y. Gdalyahu, Ridges' Corner Detection and Correspondence. In Computer Vision and Pattern Recognition, pages 976–981, 1997; and H. Wang and M. Brady. Real-Time Cornet Detection Algorithm for Motion Estimation. Image and Vision Computing 13 No. 9, pages 695–703, 1995.

State of the art methods involve estimation of the correlation surface around points in the image and description of those surfaces as linear or polynomial surfaces. These methods are described in the following references:

M. Ben-Ezra, S. Peleg and M. Werman. Efficient Computation of the Most Probable Motion from Fuzzy Correspondences. Workshop on Application of Computer Vision, 1998; and M. Irani and P. Ananda, "Robust multi-sensor image alignment", Proceedings of International Conference on Computer Vision, January 1998.

The simplest motion detection in an image sequence is based on image difference. For static cameras and fixed photography conditions, any two successive frames are the same except for the moving objects. Hence, subtracting these images obtains an image that its non-zero areas relate to moving objects. This method is easy to compute but it is sensitive to illumination changes, to any kind of camera motion (e.g. vibrations), camera noise, turbulence and to cyclic motions, such as trees moving in the wind.

Systems for detecting and tracking moving objects from moving cameras commonly use a two-phase process: The motion detection phase follows the registration phase. Existing systems uses an accurate resolver such as a sensor mounted on the camera, to achieve registration. Other systems compute registration from the images.

The present invention seeks to provide a fast and robust method for image registration and motion detection based on discrete probability representation of the local motion. This allows the implementation of a real-time system on PC computer which can register images and detects moving objects in video images, even when the camera is moving.

FIG. 1 is a simplified flowchart illustration of a preferred method for aligning two images whose misalignment occurred as a result of a physical process causing linear displacement.

Figure 2:
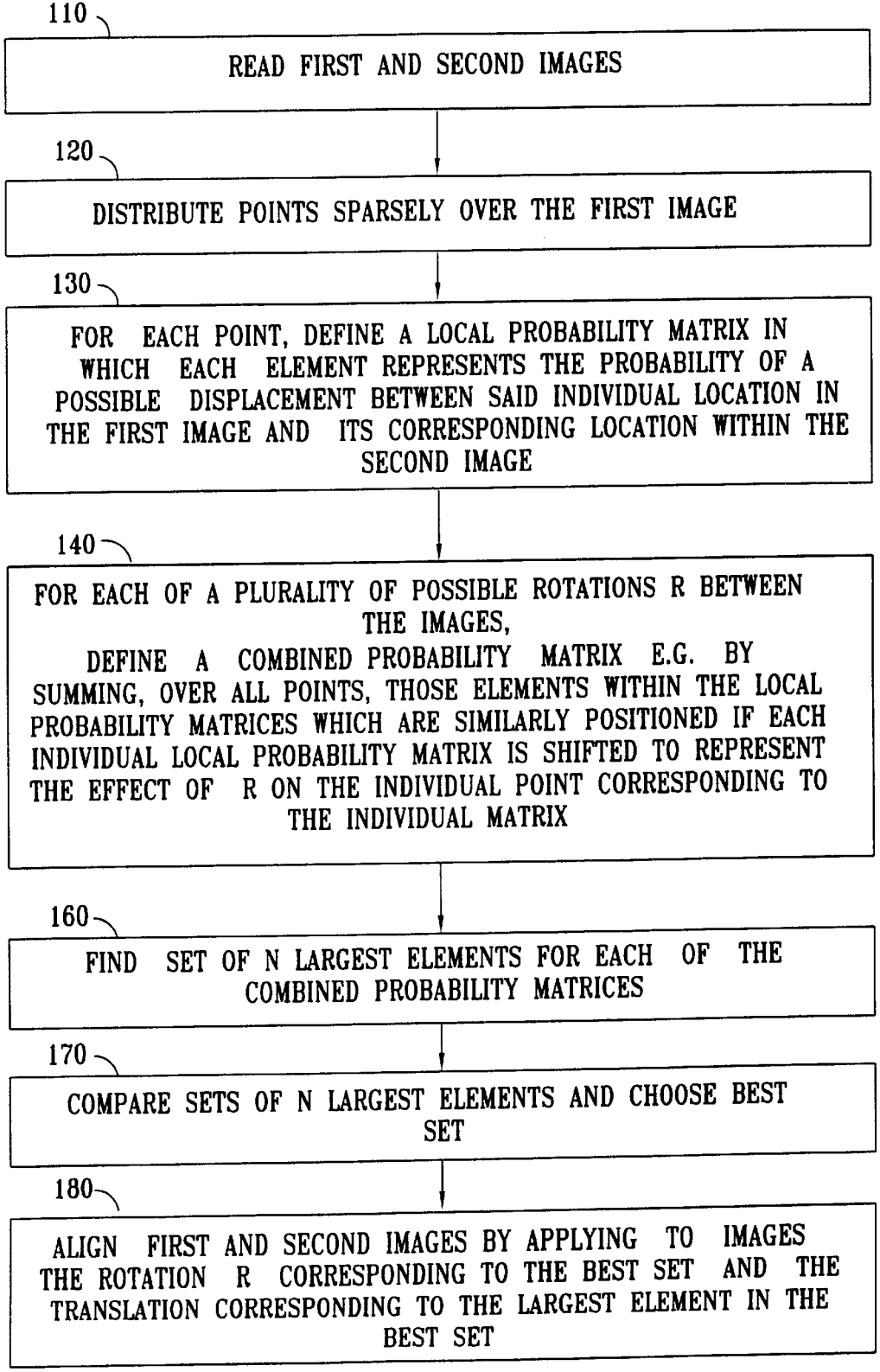
FIG. 2 is a smolified flowchart illustration of a preferred method for aligning two images whose misalignment occurred as a result of a physical process causing linear displacement and rotation.

FIG. 2 is a simplified flowchart illustration of a preferred method for aligning two images whose misalignment occurred as a result of a physical process causing linear displacement and rotation.

Figure 3:
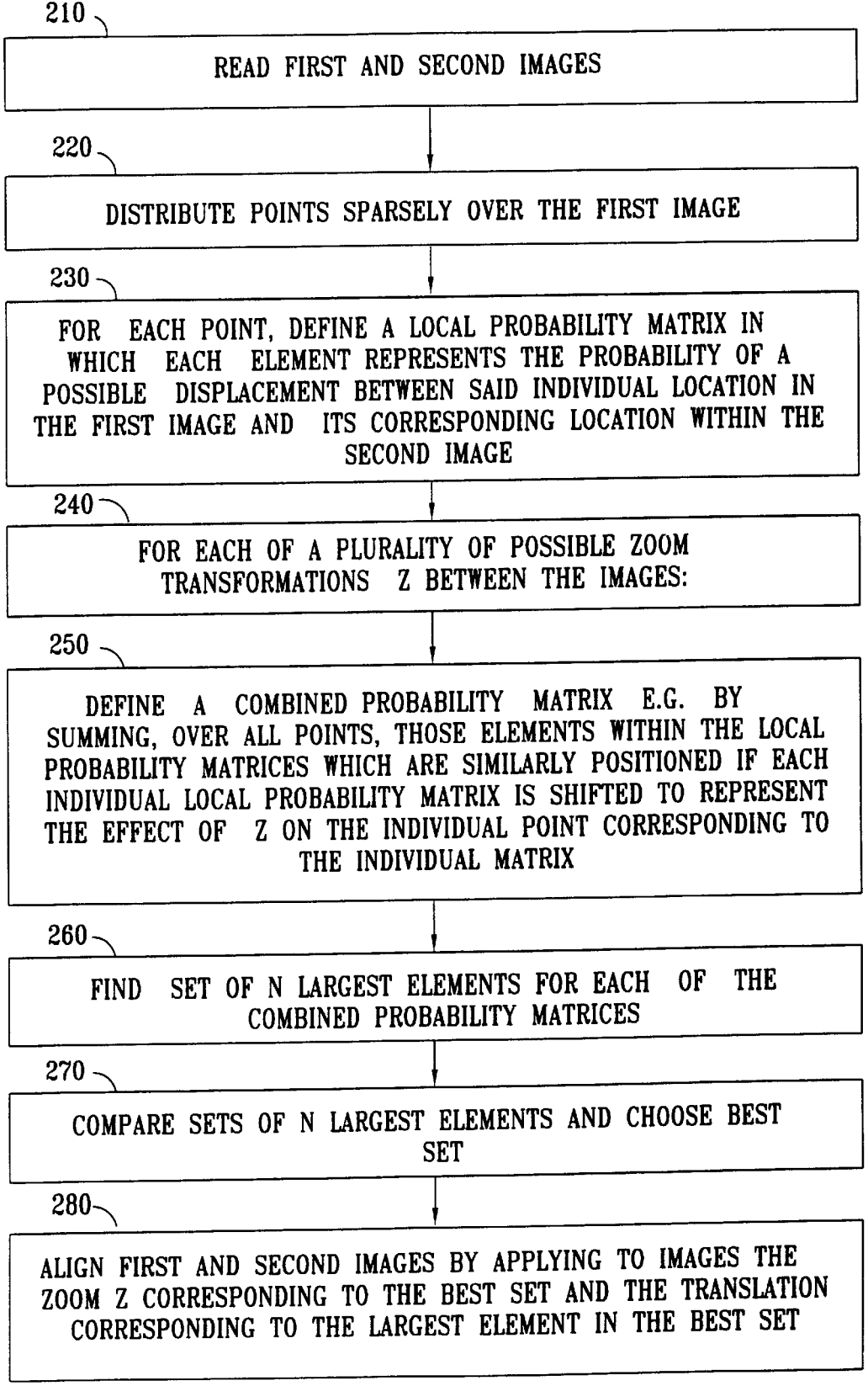
FIG. 3 is a simplified flowchart illustration of a preferred method for aligning two images whose misalignment occurred as a result of a physical process causing linear displacement and a zoom transformation.

FIG. 3 is a simplified flowchart illustration of a preferred method for aligning two images whose misalignment occurred as a result of a physical process causing linear displacement and a zoom transformation.

Figure 4:
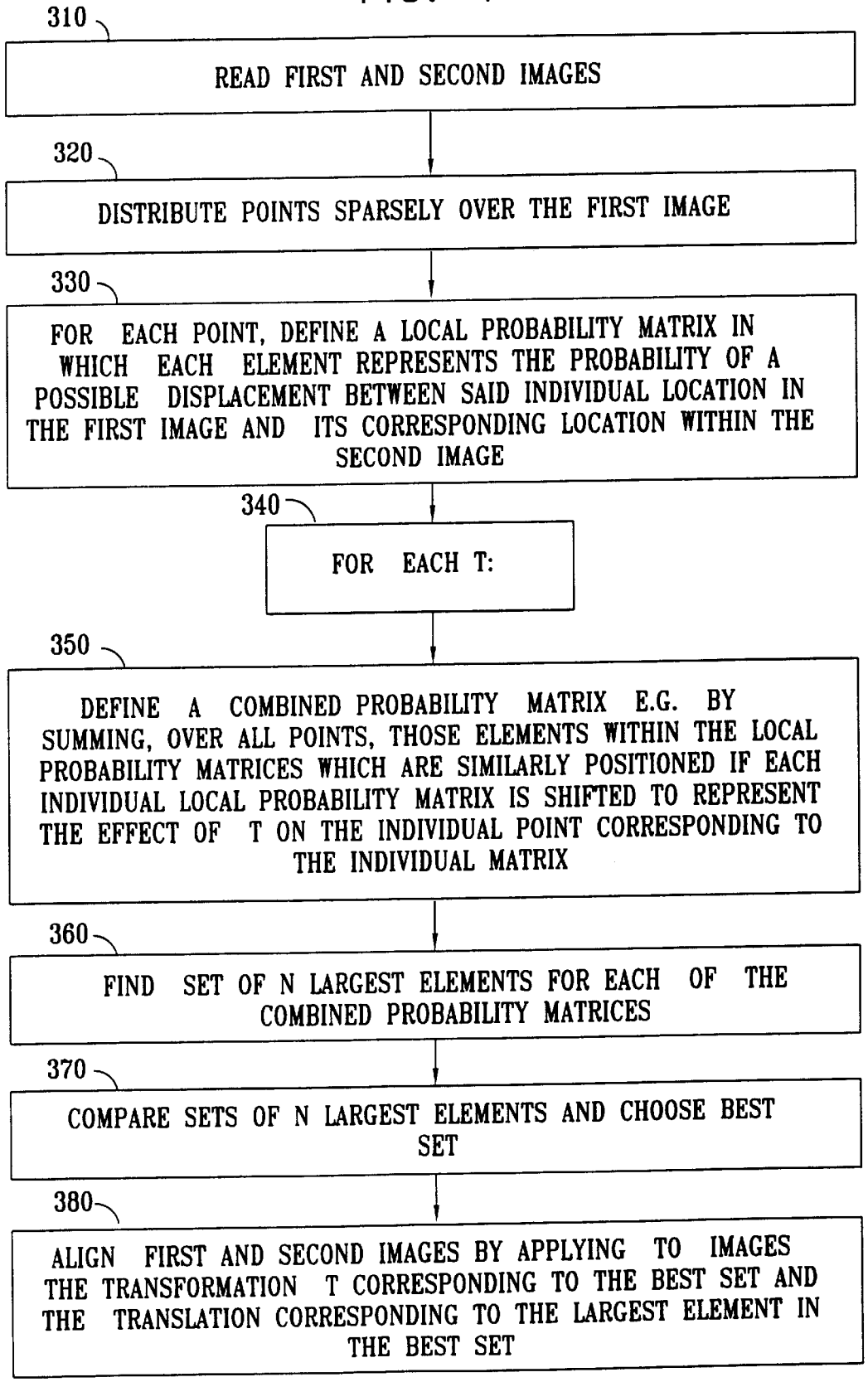
FIG. 4 is a simplified flowchart illustration of a preferred method for aligning two images whose misalignment occurred as a result of a physical process causing linear displacement and one of a plurality of zoom and/or rotation and/or other affine transformations T.

FIG. 4 is a simplified flowchart illustration of a preferred method for aligning two images whose misalignment occurred as a result of a physical process causing linear displacement and one of a plurality of zoom and/or rotation and/or other affine transformations T.

Figure 5:
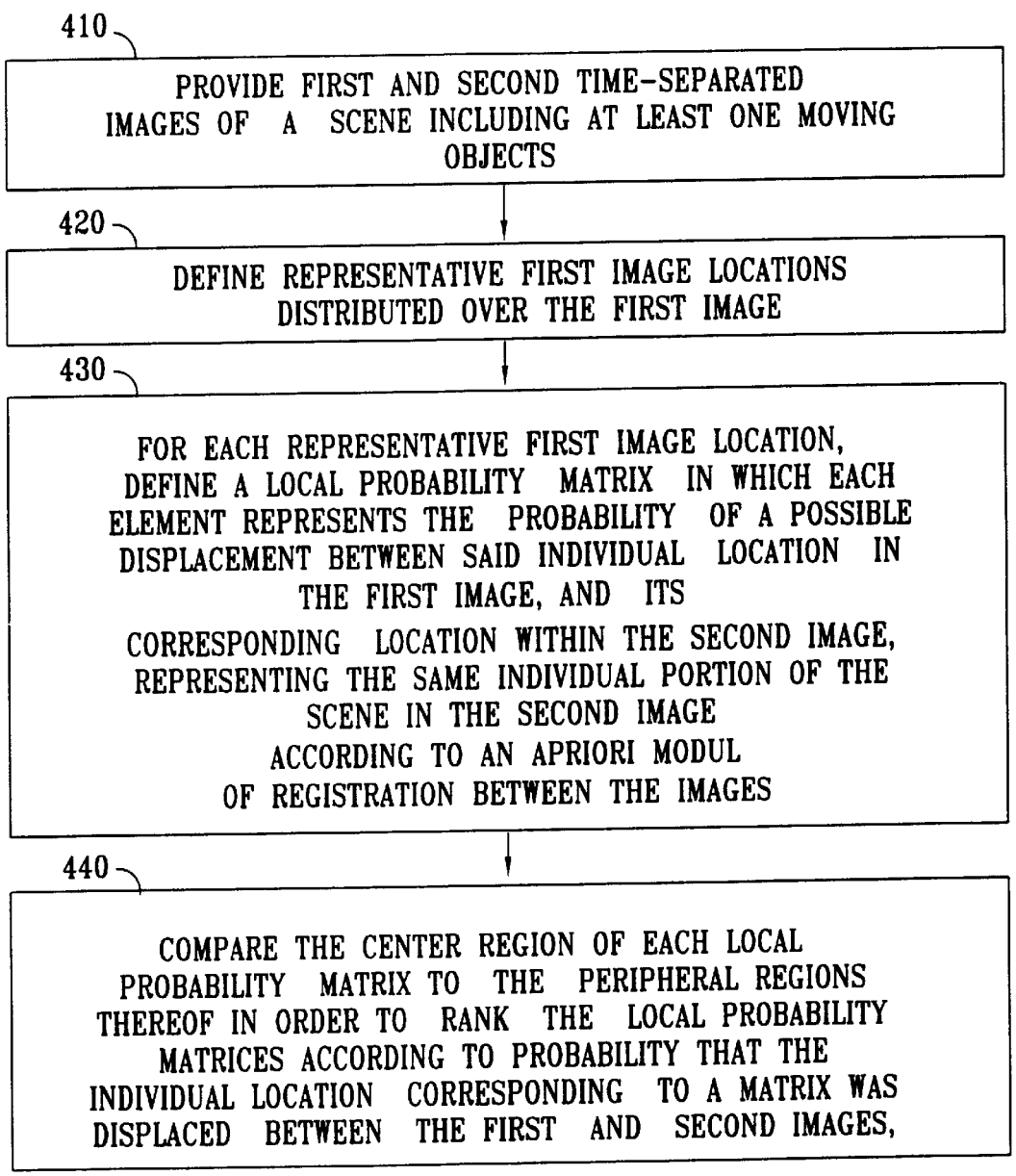
FIG. 5 is a simplified flowchart illustration of a preferred method for detection of moving objects in a scene imaged by a camera whose motion is apriori known.

FIG. 5 is a simplified flowchart illustration of a preferred method for detection of moving objects in a scene imaged by a camera whose motion is apriori known.

Figure 6:
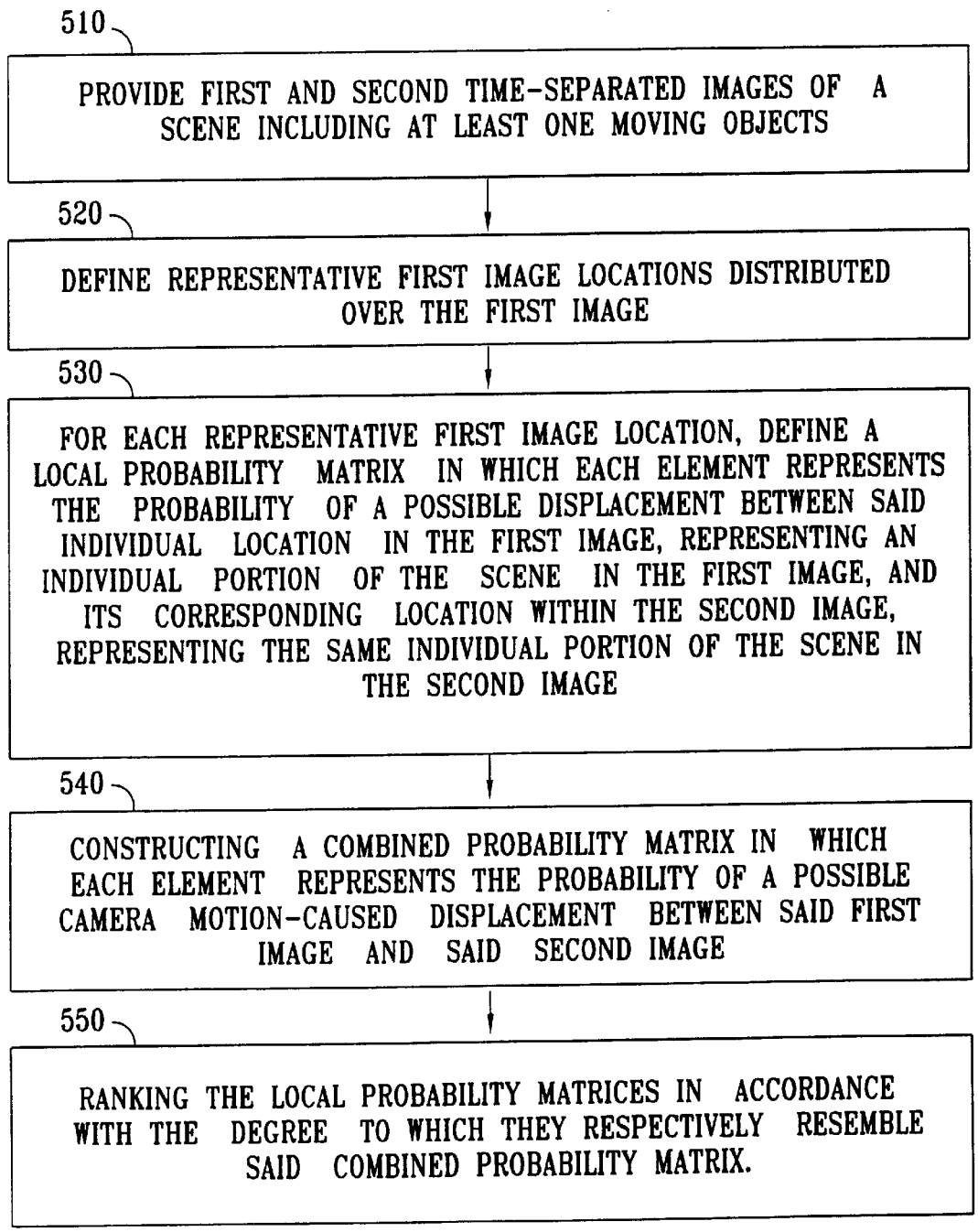
FIG. 6 is a simplified flowchart illustration of a preferred method for detection of moving objects in a scene imaged by a camera in motion.

FIG. 6 is a simplified flowchart illustration of a preferred method for detection of moving objects in scene imaged by a camera in motion.

Figure 7:
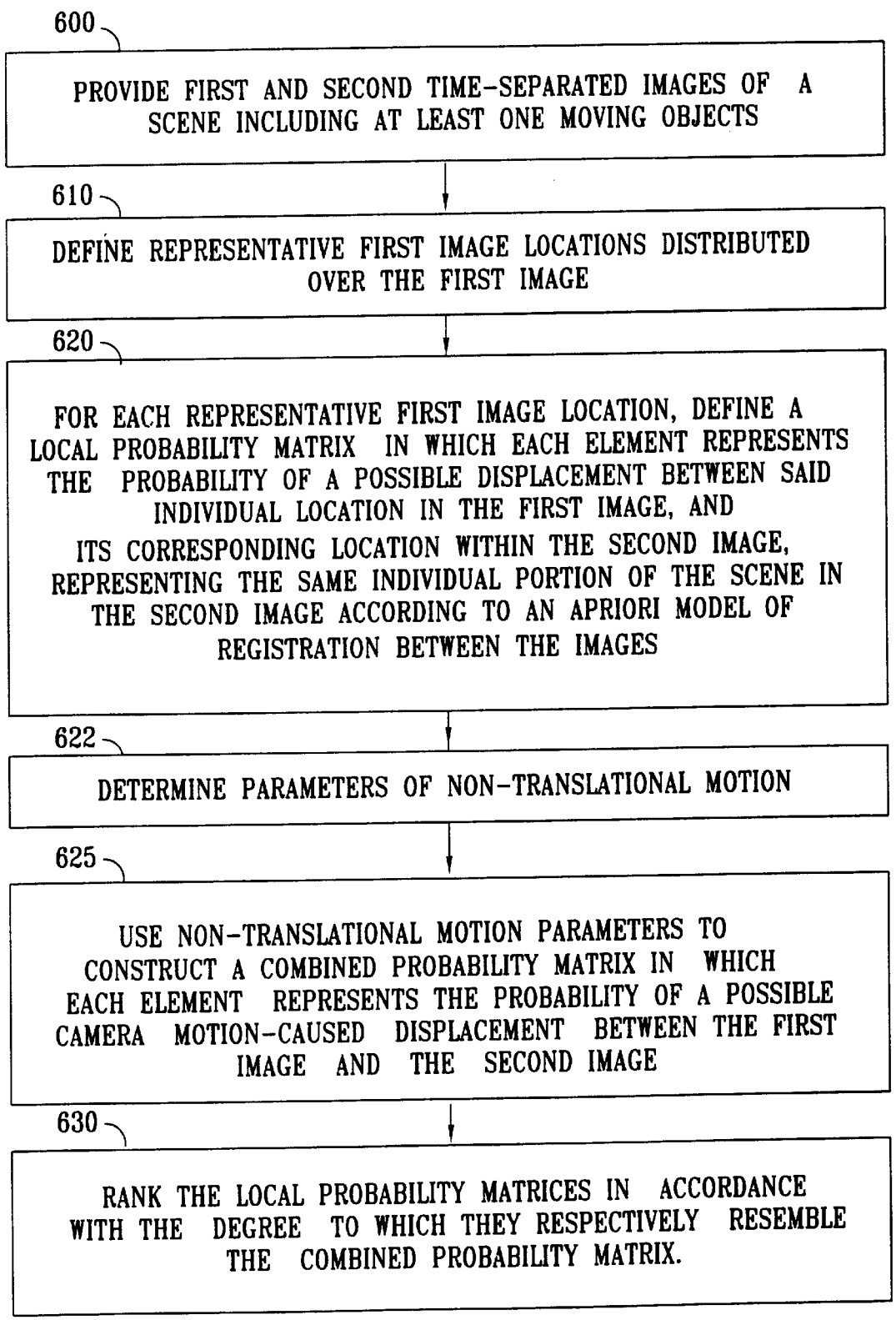
FIG. 7 is a simplified flowchart illustration of a preferred method for detection of moving objects in a scene imaged by a camera which is in motion, the camera's motion having a non-translational component.

FIG. 7 is a simplified flowchart illustration of a preferred method for detection of moving objects in scene imaged by camera which is in motion, the camera's motion having a non-translational component.

In step 622, the parameters of the non-translational motion are preferably determined using the method of FIG. 4.

Step 10 of FIG. 1, step 110 of FIG. 2, step 210 of FIG. 3, step 310 of FIG. 4, step 410 of FIG. 5, step 510 of FIG. 6, and step 600 of FIG. 7 all pertain to provision of two time-separated images of a scene. This may, for example, be performed by capturing frames from a video stream using any capture device appropriate for the video source. For example, a PAL/NTSC analog source may be captured with a Matrox Meteor Frame Grabber Board.

According to a preferred embodiment of the present invention, image alignment is implemented along an image sequence using a small set of points whose local displacement is computed and represented as a probability distribution over a set of possible displacements, as described in the following publication:

Y. Rosenberg and M. Werman. Representing Local Motion as a Probability Matrix and Object Tracking. In Darpa Image Understanding Work Shop, pages 153–158, 1997.

Alignment may be performed using any suitable method, and may for example be carried out by the iplWarpAffine( ) function of Intel's Image Processing Library.

Typically, the output of the alignment process (step 60 in FIG. 1, 180 in FIG. 2, 280 in FIG. 3, 380 in FIG. 4) is the set of parameters for the alignment, and a probability distribution describing the uncertainty of the displacement of each pixel under the computed alignment parameters.

The present invention allows only a small set of points to be used and is therefore much faster. This probabilistic representation preserves more motion information than other methods and is more robust to noise.

A coarse to fine scheme is used to handle large displacements. It is based on image pyramids but does not require image warping as other methods do.

To reduce the number of examined image points, a preferred method is described which is operative to measure the contribution of each point to the computation of the displacement, together with a method which improves the position of the selected points iteratively along the image sequence.

For the detection of moving objects, the displacement probability is computed for each point on a predefined grid, and is compared to the displacement probability, which results from the alignment process. This comparison yields the probability that the point belongs to a moving object.

Figure 8:
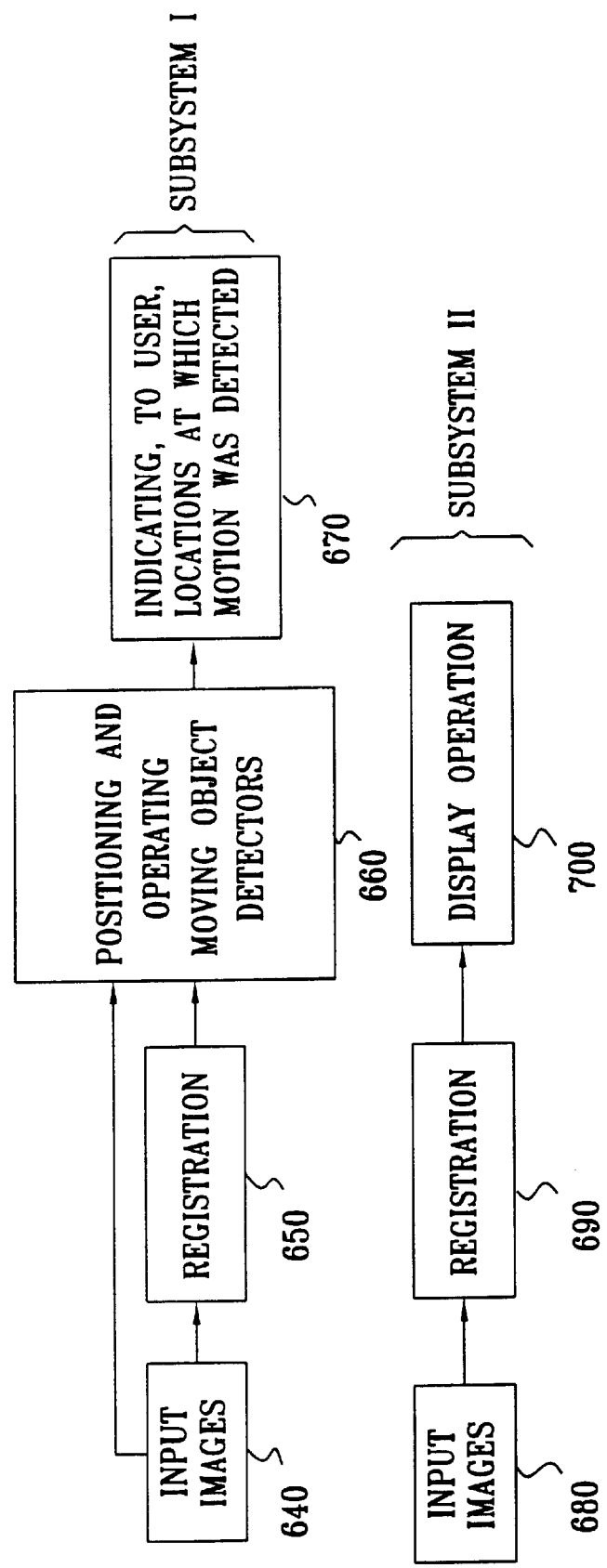
FIG. 8 is a simplified block diagram illustration of a motion detection system which performs stabilization and/or panorama creation.

FIG. 8 is a simplified block diagram illustration of a motion detection system which performs stabilization and/or panorama creation. The system of FIG. 8 includes first and second subsystems as shown. Both subsystems use image registration. The "display operation" is warping for video stabilization and pasting images in the required locations for panoramic view image creation.

A preferred method for registration is now described.

The method of the present invention preferably uses a small set of points, but without a time consuming feature detection phase as described in detail below. For each point in the set, as described in the above-referenced 1997 publication by Rosenberg and Werman, we construct a probability matrix that assigns a probability or likelihood for any possible displacement of the point. The maximum likelihood solution of the motion parameters is preferably computed using the probability matrices of all the points. The uncertainties of the solution are expressed in a global probability matrix. The method preferably supports the following motion models:
1. Pure translations in the image plane.
2. A motion model having three/four parameters can be used to add a rotation around the third axis or/and zoom.
3. An Affine model (six parameters).

Compensating large displacements can be done using a coarse to fine approach, computing finer resolutions using the motion computed in the coarser ones. Conventional Gaussian and Laplacian pyramids such as those described in Peter J. Burt, "Smart sensing within a pyramid vision machine", Proceedings of the IEEE, Vol. 76, No. 8, August 1998 may be used for this task. Alternatively, any other coarse to fine approach may be employed. Laplacian pyramids can be used for images taken under different illumination conditions.

A preferred method for creation of a probability matrix is now described. The method described herein is suitable for implementing step 30 of FIG. 1, step 130 of FIG. 2, step 230 FIG. 3, step 330 of FIG. 4, step 430 of FIG. 5, step 530 of FIG. 6, step 620 of FIG. 7, step 750 of FIG. 9 and step 830 of FIG. 10. The method employs a discrete representation of the local motion in which each possible motion is weighted according to its likelihood, as described in detail in the above-referenced 1997 publication by Rosenberg and Werman.

Two images $\psi_1$ and $\psi_2$ are taken from a video sequence of a dynamic scene. Given a point p in $\psi_1$, let W be a window surrounding this point, and assume that all the pixels in W have the same displacement as point p between frames $\psi_1$ and $\psi_2$. We want to compute the probability distribution of the displacement of p between the two frames.

Below we present the justification for one of many possible methods to compute the matrix representing such a probability distribution.

Let the displacement be d=(u,v) and let $W_1$ be the window around p in image $\psi_1$ and let $W_2$ be the window around the point p+d in image $\psi_2$. Let $P(W_2|W_1,d)$ be a known function of the probability distribution of $W_2$ given d and $W_1$. A preferred method for estimating this function is described below.

Define the range $U_{min} \ldots U_{max}, V_{min} \ldots V_{max}$. Such that all possible values of d=(u,v) are inside the range.
Using Bayes' law we can write:

$$p(d|W_1, W_2) = \frac{P(W_2|W_1, d) \cdot P(d)}{P(W_2)}$$

where:

$$P(W_2) = \sum_d P(W_2|W_1, d) \cdot P(d)$$

Let Y-be defined as $Y_{u,v}=P(W_2|W_1,d=(u,v))$, After substituting we get:

$$P(d=(u,v)|W_1,W_2)=K \cdot Y_{u,v} \cdot P(d=(u,v))$$

P(d=(u,v)) is the prior probability that the displacement is d. If no prior information is available, we take P(d) to be a constant.

To estimate $P(W_2|W_1,d=(u,v))$, use the sum of squared differences:

$$Y_{u,v}=P(W_2|d,W_1)=f(SSD(d))$$

where $$SSD(d) = \sum_{1,i \in W_1} [\Psi_2(i+d_x, j+d_y) - \Psi_1(i,j)]^2$$

Usually, noise is presented in the image. The noise is generated by several sources: the camera noise, rotations, quantization errors etc. To take it into account the probability distribution can be also function of the noise. One possible function, induced by the Maximum Entropy Criteria, is:

$$P(W_2|d,W_1)=C \cdot e^{-SSD(d)/\sigma^2}$$

where C is a normalization factor (The sum of the matrix should be one), and $\sigma^2$ is the expected noise level. A feasible value for $\sigma^2$ depends on the camera. For standard analog cameras such as Sony vidCams, a value of between 1%–4% of the gray level range is good to use.

The probability distribution matrix is one example of a basic element for the image registration and object tracking methods shown and described herein.

It is appreciated that probability values need not be used since alternatively, other suitable heuristics may be employed to score or rank displacements, such as but not limited to SSD(d) values defined above or correlation values.

Furthermore, information regarding the rank of the displacements need not be represented as a matrix. Alternatively, any other suitable data structure may be employed such as but not limited to a list or one-dimensional array.

A preferred method for computing the motion models is now described. Preferably, an image registration process is employed, which uses the displacement probability matrices of several points on the image. The image registration process uses a relatively small set of points, which do not have to be on corners or on edges and can be located randomly. The output of the registration process typically comprises is a set of parameters for the alignment transformation with a probability distribution that shows the accuracy of the registration.

This method yields a maximum likelihood solution which is more robust then other solutions such as $L_2$ or $L_1$ solutions, as described in the following publication:

M. Ben-Ezra, S. Peleg and M. Werman. Efficient Computation of the Most Probable Motion from Fuzzy Correspondences. Workshop on Application of Computer Vision, 1998.

There are many ways to represent parametric alignment between images, and the following template of an affine alignment is commonly used:

$$\begin{pmatrix} x' \\ y' \end{pmatrix} = \begin{pmatrix} a11 & a12 \\ a21 & a22 \end{pmatrix} \begin{pmatrix} x \\ y \end{pmatrix} + \begin{pmatrix} w_x \\ w_y \end{pmatrix}$$

In this template a point (x,y) in one image is transformed to location (x',y') in the second image. The registration method can be extended to support more complex transformations as well.

A preferred method of image registration for applications in which translation of images has occurred is now described. The following method of registration to find uniform image-plane translations is suitable for implementing step 40 in FIG. 1.

For applications in which image plane translations can be assumed, the estimation of the global image-plane translation can be performed by summing the local displacement probability matrices $Y_i$.

$$P_{sum}(u, v) = \sum_{i=1...N} Y_i(u, v)$$

$P_{sum}(u,v)$ can be viewed as the expected number of points that agree with the estimate for the displacement $d=(u,v)$ Normalizing $P_{sum}$ gives a probability matrix approximating the probability distribution of the global image translation. This approximation is equivalent to a Monte-Carlo distribution approximation. The only difference is that each point contributes not only to one cell $(u,v)$ but also to all the cells with weights according to its probability distribution.

This summation is robust for outliers. The influence of a small number of outliers is not destructive. The robustness applies also when the image motion is not an exact translation and the probability matrices contain information about the deviation from the main translation.

Other estimates are possible such as point multiplication of these matrices after accounting for noise.

A preferred method of Image Registration for applications in which Translation and Rotation of images has occurred is now described. The described method is suitable for implementing steps 140–170 of FIG. 2.

The method described herein is operative to implement registration for images that translate and also rotate with angle $\theta$ about the center of the image. Consider first the case in which $\theta$ is known and only the translation is to be found. The rotation shifts each point $p_i=(x_i,y_i)$ by $(dx_i,dy_i)=dp_i=A_\theta p_i-p_i$ where $A_\theta$ is the rotation matrix for $\theta$. Knowing this, a possible estimate to the global displacement probability matrix for the translation given the local displacement probabilities $Y_i$ is:

$$P^{\theta}_{sum}(u, v) = \sum_{i=1...N} Y_i(u - dx_i, v - dy_i)$$

If the values $dx_i$, $dy_i$ are not integers, the matrix Y can be interpolated at an appropriate accuracy level before adding it to $P_{sum}$.

When $\theta$ is unknown, its value can be sequentially searched with steps of $d\theta$. For each angle $\theta_j=\theta_{min}, \theta_{min}+d\theta, \theta_{min}+2d\theta, \ldots \theta_{max}$ the matrix $P^{\theta j}_{sum}$ is computed (steps 140, 150), and the angle $\theta_j$ which gives the 'best' $P^{\theta j}_{sum}$ is selected. The matrix $P^{\theta j}_{sum}$ can then be used to describe the uncertainty in the computed global translation. We usually search for five different values for $\theta$.

Many different methods may be employed to define the "quality" of the global displacement probability matrix $P^{\theta j}_{sum}$. One method is to choose the matrix having the maximal peak, as described above with reference to steps 160 and 170 of FIG. 2. Alternatively, the matrix having minimal entropy may be selected, or the matrix whose two largest peaks have the maximal sum.

The shift of the local displacement distribution matrices for computing $P^{\theta j}_{sum}$ is determined by the values $\theta_{min}, \theta_{max}$, and this determines the appropriate size of the distribution matrix for each point. Points that are farther away from the center of the image will need larger matrices because the shift caused by rotation is larger. Therefore, when searching a large range of values for the rotation angle, the size of the local displacement probability matrices is typically increased.

The value used for $d\theta$ is typically such that the maximal value any point is shifted is less than three.

Summing is not the only way to generate a combined matrix. Alternatively, the matrices may for example be multiplied after accounting for noise.

The error in the computed value of $\theta$ can be up to $d\theta/2$. To get a more accurate result, a conjugate gradient minimization can be used with the following equation for deriving $P^{\theta j}_{sum}$:

$$\frac{\partial}{\partial \theta_j} P^{\theta j}_{sum}(u, v) = \frac{\partial}{\partial \theta_j} \sum_{i=1...N} Y_i(u - dx_i, v - dy_i) =$$

$$\sum_{i=1...N} \frac{\partial}{\partial dx_i} Y_i(u - dx_i, v - dy_i) \frac{\partial x_i}{\partial \theta_j} + \frac{\partial}{\partial dy'} Y_i(u - dx_i, v - dy_i) \frac{\partial y_i}{\partial \theta_j}$$

where $\partial x_i/\partial\theta = x \cdot \cos\theta + y \cdot \sin\theta$ and $\partial y_i/\partial\theta = y \cdot \cos\theta - x \cdot \sin\theta$.

The derivatives of $Y_i$ are approximated using a bilinear intrerpolation of the matrix $Y_i$.

The method of FIG. 4 is useful in applications in which Translation, Rotation and/or Zoom are assumed to have occurred. A preferred method for implementing Steps 340, 350, 360, 370 of FIG. 4 is now described.

Treatment of the zoom-rotation case is similar to the implementation of steps 140–170 of FIG. 2, described above. In this case, the sequential search is preferably performed in two parameters: The zoom and the rotation.

Typically, five values are checked for each parameter, which yield 25 sum matrices. (Steps 340, 350).

The chosen parameters set is the one that yielded the sum matrix with the maximal peak. (Steps 360, 370).

The fine-tuning step is performed using conjugate gradient minimization as described above. In this case however, the minimization is computed iteratively on the two parameters.

A preferred method of Image Registration for Affine Transformation is now described.

The displacement $(\Delta x_i, \Delta y_i)$ caused by an affine transformation of a point $p_i=(x_i,y_i)$ is:

$$\Delta x_i = x_i' - x_i = a_{11}x_i + a_{12}y_i + w_x - x_i$$

$$\Delta y_i = y_i' - y_i = a_{21}x_i + a_{22}y_i + w_y - y_i$$

With a similar search method as described above, it is possible to search for a full parameter set for an affine transformation $A=\{a_{11}, a_{12}, a_{21}, a_{22}\}$ which gives the best summation matrix $P^A_{sum}$. However, searching in a 4-dimensional space can be very slow. An alternative is to search for the pairs of parameters $a_{11}, a_{12}$ and $a_{21}, a_{22}$ separately with the method described below.

Assume that all he points $p_i=(x_i,y_i)$ have the same $x_i=x$. In this case, $\Delta x$, $\Delta y$ of each point $P_i$ depend only on $a_{12}, a_{22}$. These parameters can now be found using a two dimensional search. When these are computed, the remaining parameters $a_{11}, a_{21}$ can also found using another two dimensional search. This way, the affine transformation can be computed performing twice a two dimensional search.

This leads to the following preferred implementation:

1. Divide the set of points into N narrow vertical strips $S_1 \ldots S_N$ (e.g. ten pixels width).
2. Perform a two dimensional search for the parameters $a_{12}, a_{22}$ For each strip compute a separate sum matrix:

$$Y_{sum}[S_i] = \Sigma_{P_i \in S_i} Y_i[u - a_{12}y_i, v - a_{22}y_i].$$

3. Choose the 'best' parameters $a_{11}, a_{21}$ that optimize the matrices set $Y_{sum}[S_j], j=1 \ldots N$. For example, choose the parameters that maximize the sum of the matrices peak:

$$e = \Sigma_{j=1 \ldots N} \max\_entry\{Y_{sum}[S_j]\}$$

4. Conduct a two dimensional search for $a_{11}$, $a_{21}$ using the computed values for $a_{11}$, $a_{21}$ and using points on all the image (no more need for strips).

In order to reduce the size of the local displacement probability matrices and the complexity of the search a coarse to fine registration scheme, based on an image pyramid, is preferably employed which does not require image warping as other methods do.

Using a conventional method such as that described in Peter J. Burt, "Smart sensing within a pyramid vision machine", "Proceedings of the IEEE, Vol. 76, No. 8, August 1988, an image pyramid is created. The registration is first performed on the topmost pyramid level and the best global registration parameters $R_1$ are found.

In the next iteration, the probability matrices are computed on the second pyramid level, where the registration parameters $R_1$ found in the previous iteration are used to compute the initial displacement. Now, the best global registration parameters $R_2$ for the second pyramid level are computed.

In the third iteration, the probability matrices are computed on the third pyramid level, where the registration parameters computed in the previous two iterations, $R_1 \cdot R_2$, are used to compute the initial displacement for each matrix. After the third iteration the best global registration parameters $R_3$ are computed. This process gives the final transformation for the registration: $R_1 \cdot R_2 \cdot R_3$.

Typically, four levels of a standard Gaussian pyramid are employed.

A preferred method for choosing the points or locations to be used for registration is now described. The method described herein is suitable for implementing step 20 of FIG. 1, step 120 of FIG. 2, step 220 of FIG. 3 and step 320 of FIG. 4.

The image registration is based on the local displacement probability matrices of N points at each pyramid level. Some points contribute more information than other points. However, searching the entire image for good locations is typically not practical in real time.

The image registration is typically operative even with a sparse set of points randomly located, or placed on some grid. In order to reduce even further the required number of points, it is possible to improve iteratively the location of the selected points used for alignment. One possible way to select these points is to start with random locations for the points, and in each new frame to find a new random location for the worst K points. For the other points, the computed image registration parameters may be used to keep them on the same image feature.

In order to keep a balanced spread of the points in the image, a point is typically not allowed to be located near another one.

A possible point relocation scheme takes each of the K worst points, and assigns a new random location to it. If this location is not valid as it is too close to other points, a new random location is assigned. This process iterates until a good location is found, but for at most I iterations.

A valid location for a point is such that it is not too close to another point, and it is not on a moving object, as detected by the motion detection method described below.

The number of points to be used depends on the scene. Usually, 100–200 points are enough for good registration. One suitable value for K is 20%. One suitable number of iterations is I=10.

A preferred method for obtaining a Quality Measure of a Point or location is now described. The point quality for registration can be measured in many ways. A simple measure could be the entropy of the displacement probability matrix. Smaller entropy indicates less ambiguity in the probability matrix for that point.

In some cases, a point A can contain more absolute information than a point B, but the information of B is more important. For example, if many points are on vertical edge and a single point p is on a horizontal edge, this point may be indispensable even that $I_p$ is relatively small.

As a possible alternative to entropy, the contribution of a point to the probability matrix of the whole registration is preferably measured:

$$GI = I(Y^+) - I(Y^-)$$

where $Y^-$ is the displacement probability matrix without point p and $Y^+$ is the displacement probability matrix including also the point p.

A preferred method of motion detection using probability matrices is now described. The method described herein is useful for implementing FIG. 5 (steps 410–440), FIG. 6 (steps 510–550), FIG. 7 (steps 600–630) and FIG. 10 (steps 830–840).

The motion detection phase is based on a set of points spread over the images called motion detectors. A motion detector is sensitive to motion different than the background. The motion detection is typically based on computing the motion probability matrix of the point and comparing it to the global probability matrix representing the camera motion. The number and the deployment of the detectors depend on the application. They can be spread over the entire image or in user-defined areas to define interest and non-interest zones. Typically, in implementing steps 420 (FIG. 5), 520 (FIG. 6) and 610 (FIG. 7), a detector is located every 5 pixels on the image.

Each detector is an image point whose displacement probability is computed and can be represented as a probability matrix, typically using the method and parameters of steps 430, 530 and 620 as described above.

The combined probability matrix of the background is typically computed as in FIG. 1, FIG. 2, FIG. 3, and FIG. 4 described above.

If the camera motion is known or fixed, a predefined combined probability matrix may be used, instead, describing what is known about the camera motion. For a fixed camera a matrix describing Gaussian probability with standard deviation of 1 may be employed.

In steps 440 (FIG. 5), 550 (FIG. 6) and 630 (FIG. 7), the displacement probability matrix of each detector is compared to the displacement probability matrix of the background.

In step 440, a matrix describing Gaussian probability with standard deviation of 1 may be employed as the displacement probability matrix, this yields the effect of comparing the peripheral regions of the matrices to their centers.

A possible way to make the comparison is as follows: Let $P_1(u,v)$ be the displacement probability distribution of a point, and let $P_2(u,v)$ be the combined probability distribution of the image induced by the previously computed background motion. We first align $P_1(u,v)$ with $P_2(u,v)$ for any motion induced by the camera, then the following computation is carried out:

$$P_m = 1 - \frac{\max\{P_1(x,y) \cdot P_2(x,y)\}}{\max\{P_1(x,y)\} \cdot \max\{P_2(x,y)\}}$$

$$P_h = \frac{\sum_{x,y} P_1(x,y) \cdot P_2(x,y)}{\max\{P_2(x,y)\}}$$

$P_m$ is the estimation for the probability that the point whose probability matrix is $P_1(u,v)$, is in motion.

The motion detection method shown and described herein need not employ the method of FIGS. 1–4 to compute alignment between images. Alternatively, any other conventional alignment method may be used to align the two images after which the motion detection method of FIG. 5 may be applied. This method is described in FIG. 10.

The methods described herein use a discrete representation of local motion to enable registration, motion detection and tracking. The discrete representation is described as being implemented using probability matrices, but other suitable methods may be employed to score the displacement represented by each entry.

According to a preferred embodiment of the present invention, sparse sets of points are used both for the registration (background motion computation) and for the motion detection, without an exhaustive search of "good points" for tracking.

This method preferably allows implementing a robust registration, motion detection and tracking system, working in real time e.g. on PC computers.

Figure 9:
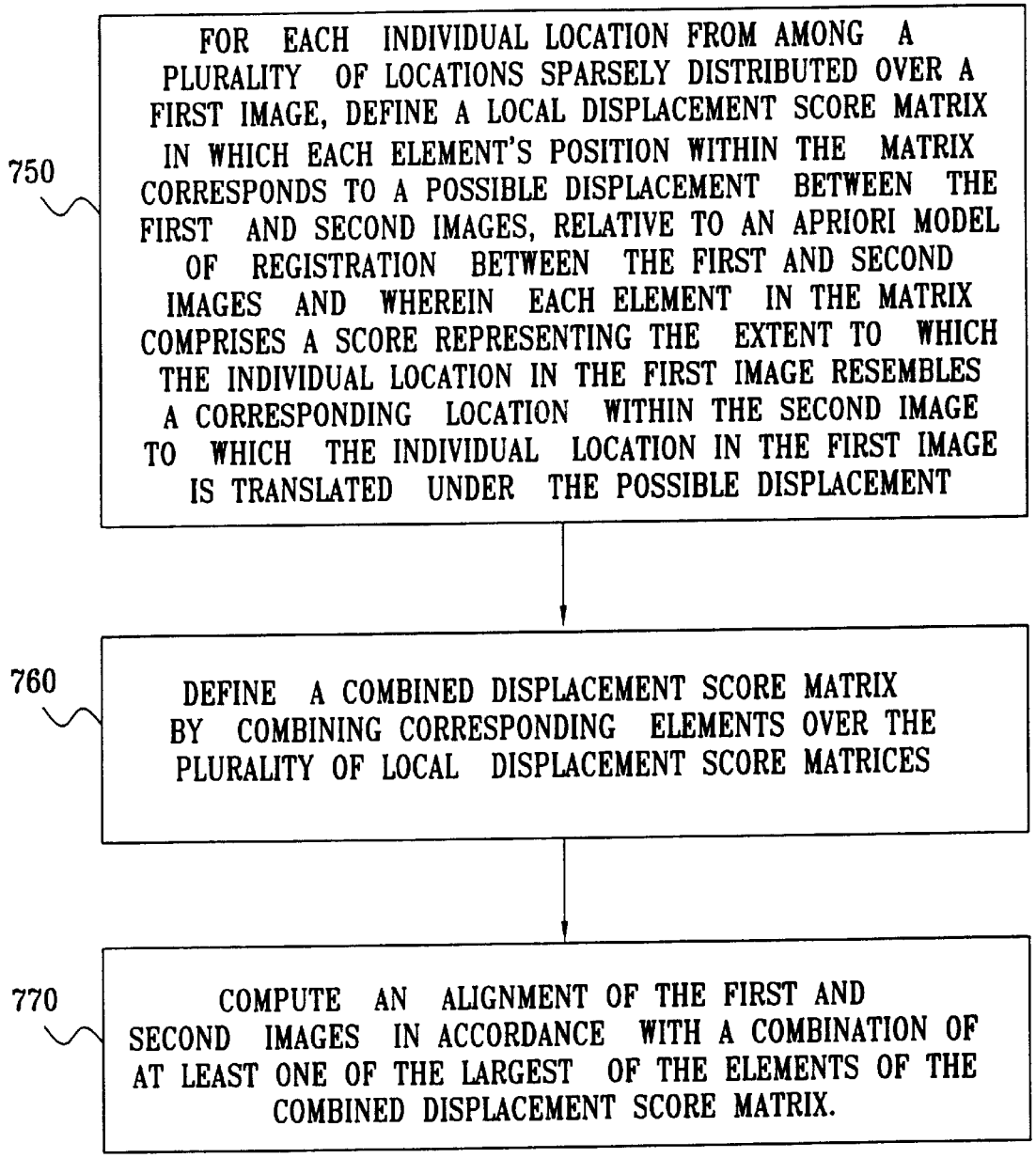
FIG. 9 is a simplified flowchart illustration of a method for registering first and second images, constructed and operative in accordance with a preferred embodiment of the present invention.

FIG. 9 is a simplified flowchart illustration of a method for registering first and second images, constructed and operative in accordance with a preferred embodiment of the present invention.

It is appreciated that the local matrix of an image location at which a horizontal edge appears will typically contain a horizontal strip of high values. Similarly, the local matrix of a location at which a vertical edge appears will typically contain a vertical strip of high values. More generally, different local matrices contain different uncertainty regions depending on the local characteristics of the image. Combining the local matrices, in accordance with a preferred embodiment of the present invention, allows different local matrices having uncertainties of different orientations to compensate for one another, thereby to generate an accurate estimate of inter-image alignment.

Figure 10:
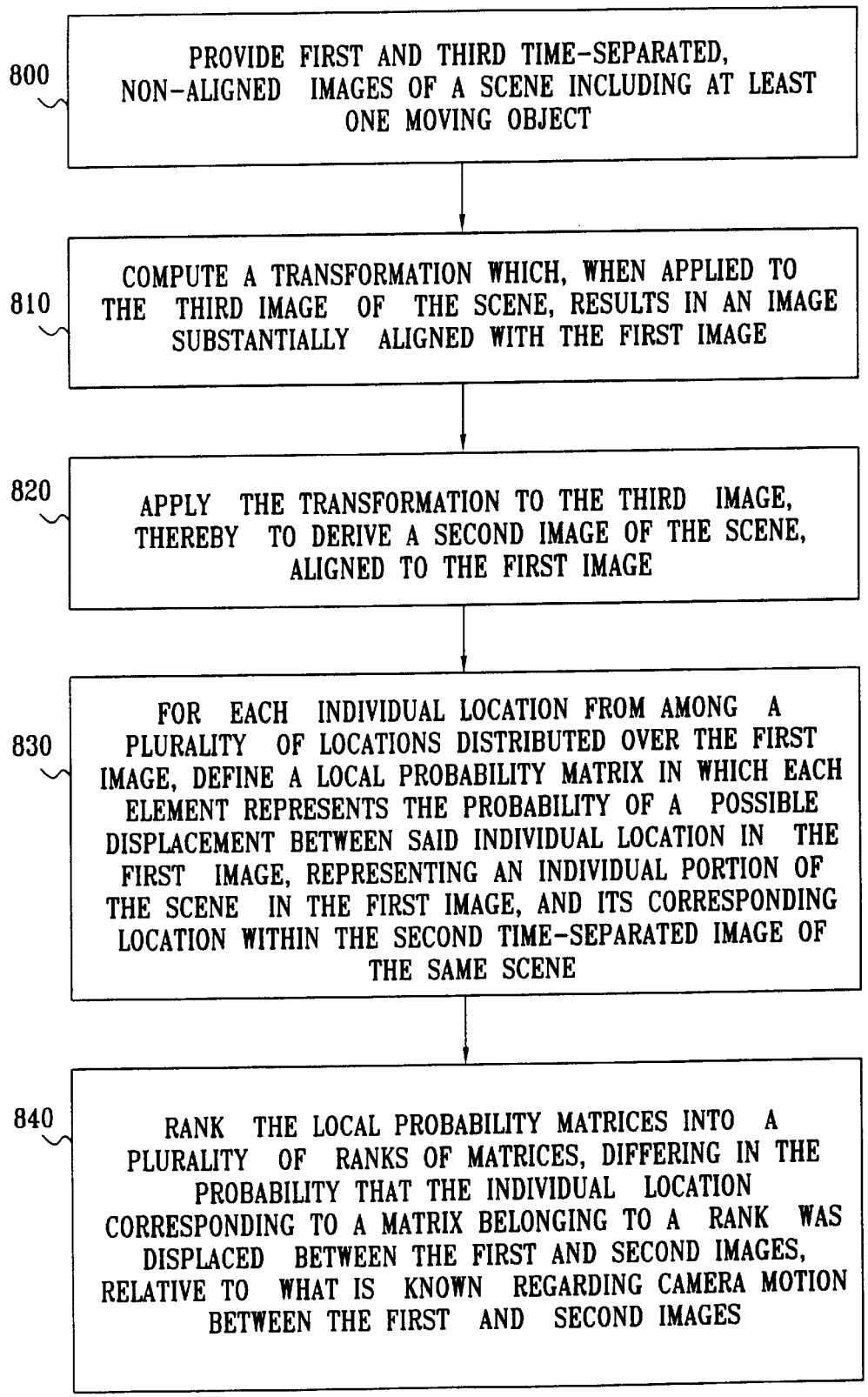
FIG. 10 is a simplified flowchart illustration of a method for detecting motion occurring between unaligned images of that motion, comprising the steps of first aligning the images and subsequently detecting the motion.

FIG. 10 is a simplified flowchart illustration of a method for detecting motion occurring between unaligned images of that motion, comprising the steps of first aligning the images and subsequently detecting the motion.

The applications of the present invention include but are not limited to the following applications: standalone, for video stabilization, panoramic view creation, video conference applications, and image matching.

In accordance with a preferred embodiment of the present invention, the "corresponding location" in the second image, corresponding to a first image location, is typically defined depending on the apriori model of registration between the images. If there is no apriori model, corresponding locations in the first and second images may be those locations which have identical coordinates. When using a pyramid, the apriori model may be the transformation computed in the upper level of the pyramid. In specific applications, specific apriori models may be suitable. For example, in motion detection applications where the camera is driven by a motor to scan an area, the shift that the motor induces between two frames may be approximately known. This approximated shift may be used as an apriori model to reduce matrix size.

The motion detection shown and described herein can be used for at least the following applications: video editing (e.g. for cutting a moving character from the original sequence, and insert it into other background), videoconference, transportation monitoring and enforcement, automatic driver, video editing, virtual studio, advanced digital camera (auto-focus, auto-exposures, shutter), video compression, burglar alarms, games, and toys.

Figure 11:
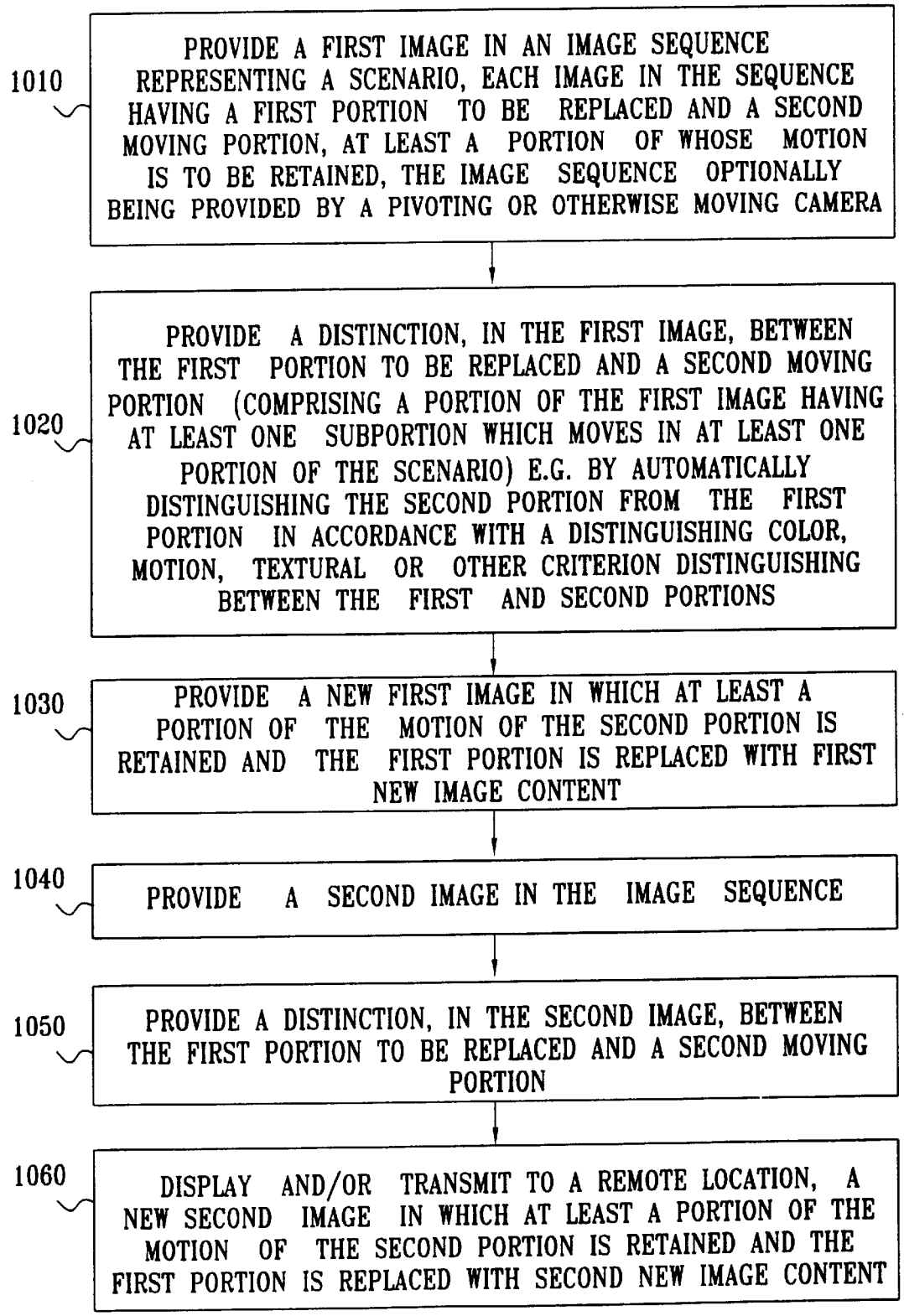
FIG. 11 is a simplified flowchart illustration of a background replacement method constructed and operative in accordance with a preferred embodiment of the present invention.

Reference is now made to FIG. 11 which is a simplified flowchart illustration of a background replacement method constructed and operative In accordance with a preferred embodiment of the present invention. As shown, an image sequence is provided (step 1010) which represents a scenario. Any suitable camera may be employed to generate the image sequence, such as a Canon VC-C1. An analog camera requires a frame grabber such as ATI's All-in-wonder.

In each image within the sequence, a portion of the image is to be replaced and a second portion represents motion within the scenario, which motion is to be at least partially preserved. For example, the scenario may be of an individual imaged over a certain natural background, which background is to be replaced by a virtual background or by an alternative natural background. The individual makes certain movements, some or all of which are to be retained. Typically, the entire individual, not only the moving parts thereof, are considered to be included in the "second portion". The appearance of the individual may be maintained, or alternatively, only the individual's motions may be entirely or partially maintained, and the individual may be replaced by a virtual individual which will perform the motions which it is desired to retain. The virtual or alternative natural background to replace the original background may be a still, i.e. a single image, or alternatively may comprise a background scenario, i.e. a sequence of background images.

In step 1020, a distinguishing criterion is employed to distinguish between the first portion (typically background) and the second portion (typically foreground). Step 1020 may comprise a color segmentation process, motion segmentation process, or texture segmentation process. Conventional methods for carrying out these processes are described in the following references:

Color segmentation:
  the above-referenced Rosenberg-Werman publication;
  Healey, G., Segmenting Images Using Normalized Color, SMC (22), No. 1, January 1992, pp. 64–73.
Motion segmentation:
  the above-referenced Rosenberg-Werman publication;
  Thompson, W. B., Combining Motion and Contrast for Segmentation, PAMI (2), No. 6, November 1980, pp. 543–549; and
  Irani, M., Rousso, B., Peleg, S., Computing Occluding and Transparent Motions, IJCV (12), No. 1, February 1994, pp. 5–16.
Texture segmentation: Reed, T. R., Wechsler, H., and Werman, M., Texture Segmentation Using a Diffusion Region Growing Technique, PR (23), No. 9, September 1990, pp. 953–960; and
Lu, C. S., Chung, P. C., Chen, C. F., Unsupervised Texture Segmentation via Wavelet Transform, PR (30), No. 5, May 1997, pp. 729–742.

Step 1020 may also be performed manually, e.g. by marking using a mouse, or manually with automatic enhancement, e.g. by allowing the user to select or sort edges or contours resulting from automatic edge or contour detection.

In step 1030, a new first image is provided in which the first portion is replaced with new image content, e.g. the original background is replaced with a new background, and the foreground motion is wholly or partially retained. A preferred method for performing this step is as follows:

a. Provide new image content to serve as background, also termed herein a "replacement image", which may comprise a single bitmap or a sequence of bitmaps such as an animation or video.

b. Resize the new image content, if necessary, such that the new image content is the same size as the original image (the image in which the background is to replaced).

c. Optionally, provide new image content to serve as foreground. For example, in chat applications, it may be desired to preserve all of the chatter's motions, however the facial or body features of the chatter are to be replaced e.g. by the corresponding facial or body features of an animal, person or fanciful figure. If, for example, the chatter is replaced by a bird image, then the chatter's arm movements and mouth movements may be represented by corresponding wing movements and beak movements on the part of the bird. Any suitable method may be employed to estimate and model the 3D motion of the limbs and or facial elements of the original chatting image, such as, for limbs, the method described in the following references:

Morris D. D., Rehg J. M., Singularity Analysis for Articulated Object Tracking, CVPR 98, pp. 289–296; and Rowley, H., Rehg, J. M., "Analyzing articulated motion using expectation-maximization", CVPR 97, pp. 935–941.

For modelling facial expressions, the techniques described in the following reference may be employed:

Parke, F. I., Waters, K., "Computer facial animation", (A. K. Peters Ltd., 1996.

Individual tracking: A suitable model for replacing the chatter (chatting individual) includes a 3D parametric model and a behavior: rules that define the way it will react to any input motion. Modelling approaches and languages describing motion are described in the above-referenced Thalmann publication.

d. Assuming the camera imaging the original image is stationary, replace each pixel not in the new second portion, as recognized in step 1020, with a corresponding pixel of the new image content provided in substep (a) and resized in substep (b).

e. If new foreground content was provided (step c), replace each pixel of the old foreground with a corresponding pixel of the new foreground provided in substep (c).

f. Merge new or old foreground with new background, using conventional merge methods such as that described in the following reference: P. J. Burt and E. H. Adelson, A multiresolution spline with application to image mosaics, ACM Transactions on Graphics, 2(4), pp. 217–236, October 1983.

Steps 1040, 1050 and 1060 are analogous to steps 1010, 1020 and 1030 except that the background replacement and optional foreground replacement are performed on a second image in the image sequence. The distinction between first and second portions (step 1050) may be provided as in step 1020 or alternatively, may be provided by tracking the first portion identified in step 1020, from the first image to the second image.

EXAMPLE 1

Figure 12A:
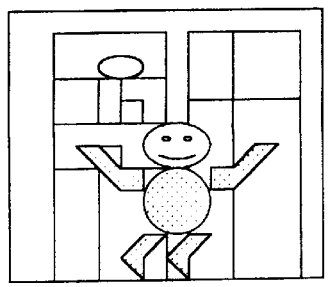
FIGS. 12A, 12B, 12C and 12D are a sequence of images respectively comprising a background to be replaced on which appears a boy.
Figure 12B:
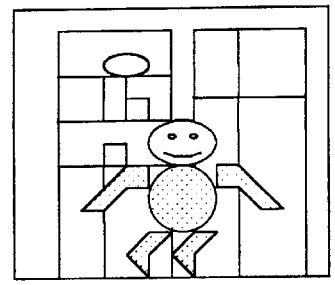
Figure 12C:
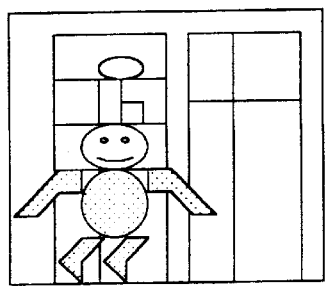
Figure 12D:
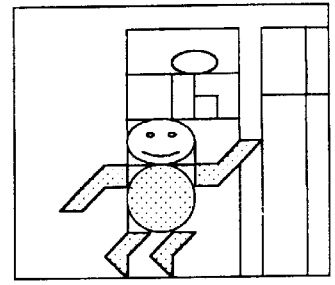
Figure 12E:
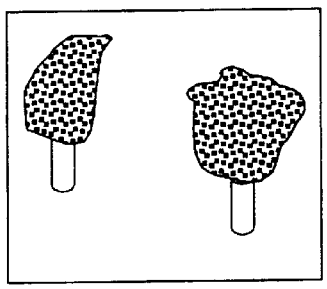
FIGS. 12E, 12F, 12G and 12H are a sequence of new background images which are to replace the backgrounds of FIGS. 12A, 12B, 12C and 12D respectively.
Figure 12F:
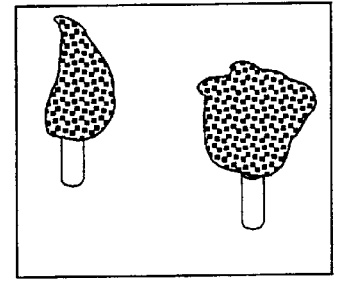
Figure 12G:
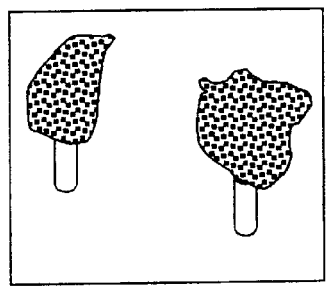
Figure 12H:
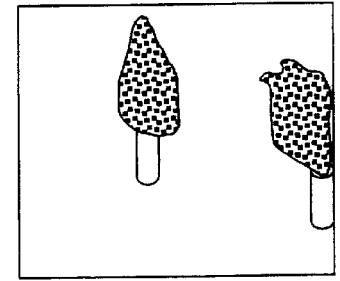
Figure 12I:
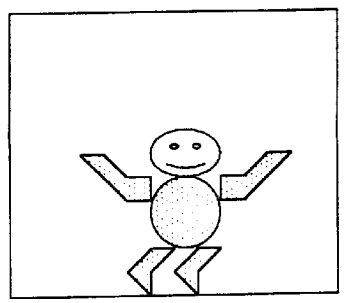
FIGS. 12I, 12J, 12K and 12L illustrate the foreground (boy) excised from the boy-with-background images of FIGS. 12A, 12B, 12C and 12D respectively.
Figure 12J:
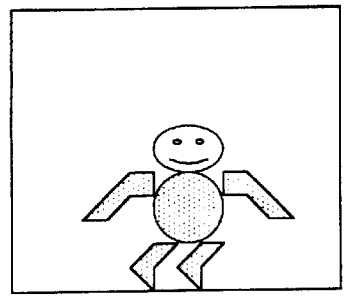
Figure 12K:
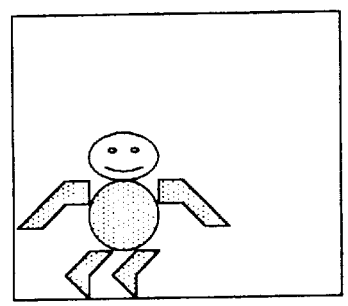
Figure 12L:
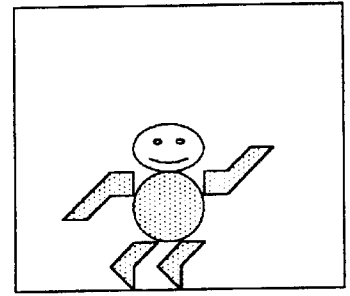
Figure 12M:
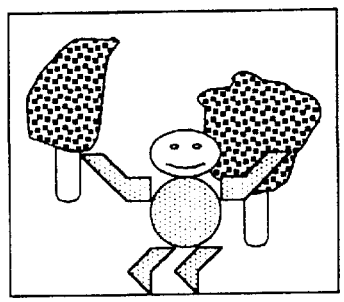
FIGS. 12M, 12N, 12O and 12P respectively illustrate the excised boy of FIGS. 12I, 12J, 12K and 12L respectively merged with the new backgrounds of FIGS. 12E, 12F, 12G and 12H.
Figure 12N:
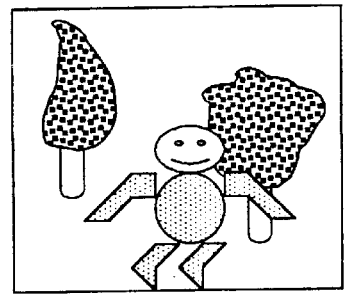
Figure 12O:
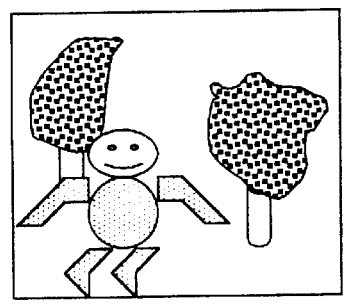
Figure 12P:
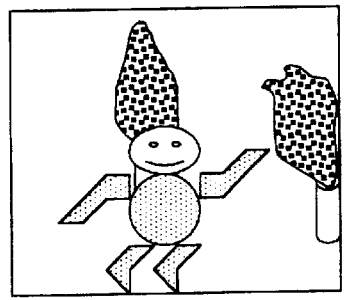
Figure 12Q:
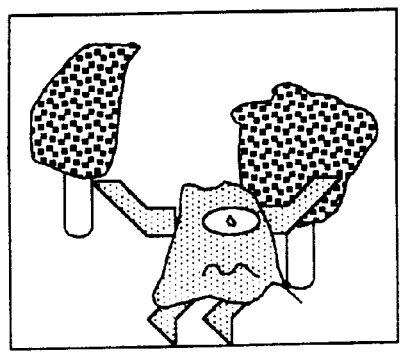
FIGS. 12Q, 12R, 12S and 12T are similar to FIGS. 12M, 12N, 12O and 12P respectively except that the boy is replaced by a creature.
Figure 12R:
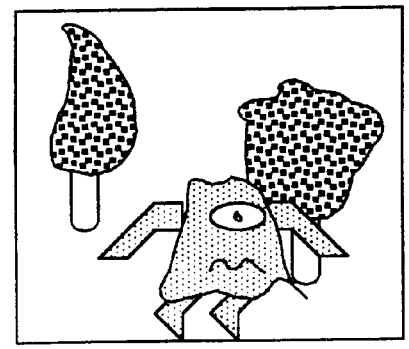
Figure 12S:
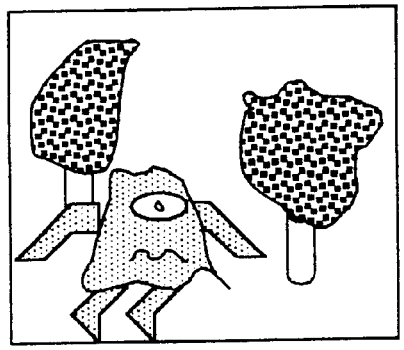
Figure 12T:
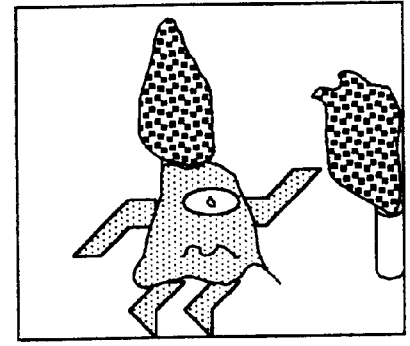

FIGS. 12A, 12B, 12C and 12D are a sequence of images respectively comprising a background to be replaced on which appears a boy in a first body position (FIG. 12A), the same, identically located boy in a second body position (FIG. 12B), the same, but differently located boy (second location) in the same second body position (FIG. 12C), and the same, but still different located boy (third location) in a third body position and a camera rotation to the left (FIG. 12D).

FIGS. 12E, 12F, 12G and 12H are a sequence of new background images which are to replace the backgrounds of FIGS. 12A, 12B, 12C and 12D respectively. As shown, in FIGS. 12E–12G, one of the trees' boughs have moved in the wind, and camera motion has occurred from FIG. 12G to FIG. 12H: the same motion as occurred from FIG. 12C to FIG. 12D.

FIGS. 12I, 12J, 12K and 12L illustrate the foreground (boy) excised from the boy-with-background images of FIGS. 12A, 12B, 12O and 12D respectively.

FIGS. 12M, 12N, 12O and 12P respectively illustrate the excised boy of FIGS. 12I, 12J, 12K and 12L respectively merged with the new backgrounds of FIGS. 12E, 12F, 12G and 12H.

FIGS. 12Q, 12R, 12S and 12T are similar to FIGS. 12M, 12N, 12O and 12P respectively except that the boy is replaced by a creature. The boy's motions, i.e. the first, second and third body positions assumed by the boy, are maintained by the creature.

Figure 13:
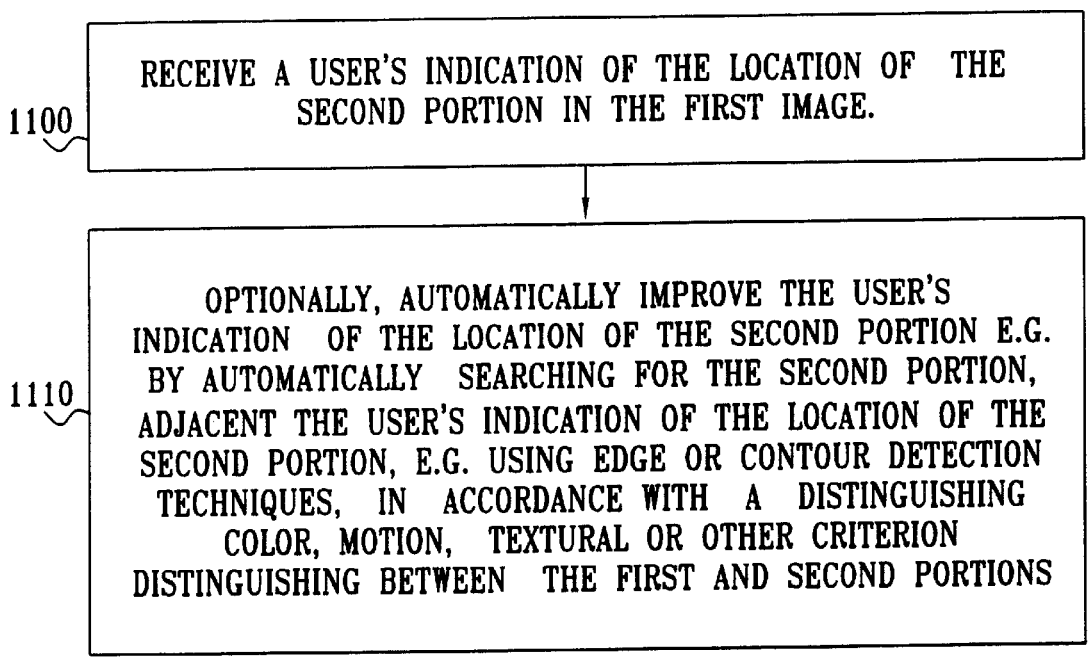
FIG. 13 is a simplified flowchart illustration of an alternative method for performing distinction providing step 20 of FIG. 11.

FIG. 13 is a simplified flowchart illustration of an alternative method for performing distinction providing step 1020 of FIG. 11, which relies on conventional edge detection or contour detection methods. First, in step 1100, the user approximately indicates, manually, the location of the second portion in the first image, using a function which may be similar to Microsoft's MFC Library drawing functions. Subsequently, in step 1110, the user's outline is improved by edge detection, using any suitable edge detection method such as that described in Canny, J., "A Computational Approach to Edge Detection", PAMI (8), No. 6, November 1986, pp. 679–698. Alternatively, a suitable contour detection method may be employed such as that described in Matals I., Benjamin R., Kitney, R., "Edge detection and curve enhancement using the facet model and parameterized relaxation labelling", IAPR 94, pp. 1–5.

Figure 14:
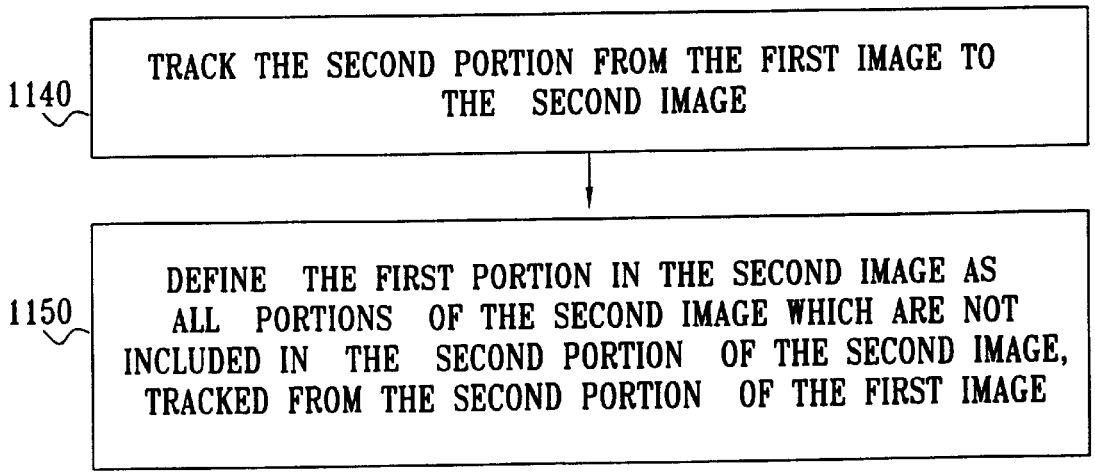
FIG. 14 is a simplified flowchart illustration of a preferred method for implementing the distinction providing step of FIG. 11, as performed on the second image.

FIG. 14 is a simplified flowchart illustration of a preferred method for performing step 1050 of FIG. 11, the distinction providing step as performed on the second image. Suitable methods for tracking are described in Bar-Shalom, Y., Fortmann, T. E., *Tracking and data association*, Boston Academic Press, 1988; and in the above—referenced Rozenberg—Werman publication.

Figure 15:
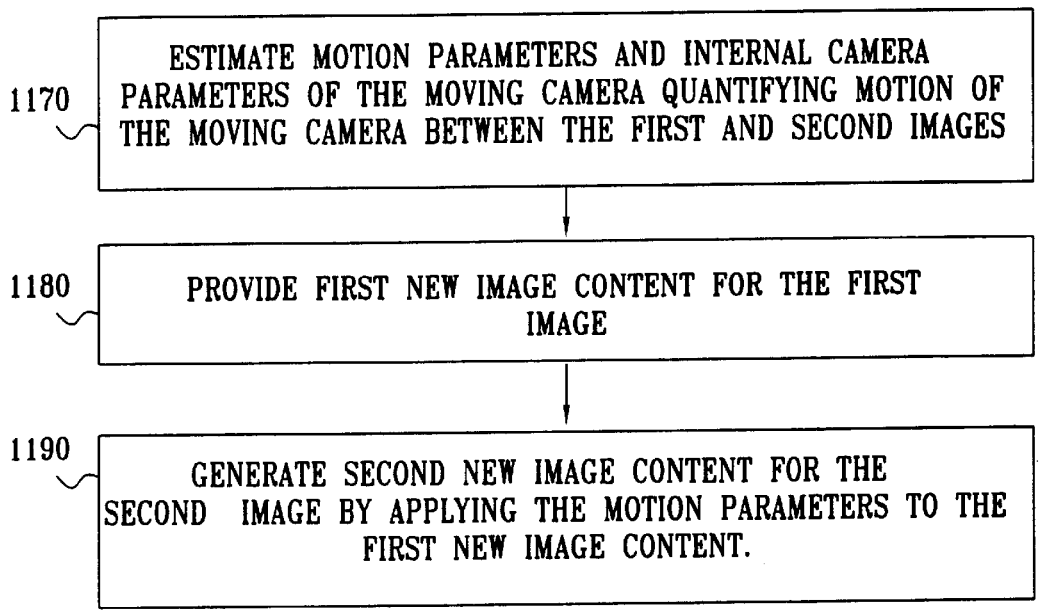
FIG. 15 is a simplified flowchart illustration of an alternative method for performing the displaying/transmitting step 60 of FIG. 11, which s suitable for use in applications in which the camera generating the image sequence is a moving camera.

FIG. 15 is a simplified flowchart illustration of an alternative method for performing the displaying/transmitting step 1060 of FIG. 11, which is suitable for use in applications in which the camera which generated the image sequence was a moving camera. The term "internal camera parameters" refers to zoom parameters and the like in which the camera's motion is virtual and not physical.

In these applications, the motion parameters of the moving camera is derived from the image sequence and the virtual camera which "generates" the new image content is moved as the real camera moves. The virtual camera "generates" the new image content by virtually moving over a large image or large video sequence only a portion of which forms each background image, depending on the position of the virtual camera. If the camera motion comprises pivoting or rotation, then the large image typically comprises a panorama. If the camera also translates, a 3D model of the environment is typically employed, which may comprises a 3D model of a natural environment or may alternatively comprise a 3D model combined with artificial texture.

Any suitable method may be employed to derive the motion parameters of the moving camera from the image sequence, such as the methods described in the following references which describe pose estimation and self calibration techniques:

The above—referenced Rozenberg—Werman publication;

Irani, M., Rousso, B., Peleg, S., Recovery of Ego-Motion Using Region Alignment, PAMI (19), No. 3, March 1997, pp. 268–272;

Rousso, B., Shilat, E., Varying Focal Length Self-calibration and Pose Estimation, CVPR98, pp. 469–474; and Pollefeys M., Koch R., VanGool L., Self calibration and metric reconstruction in spite of varying and unknown internal camera parameters, ICCV 98.

Step 1190 may be performed by employing conventional methods for generating a synthetic image given a 3D model and a virtual camera, the virtual camera comprising an indication of came motion and internal parameters' change obtained from the real camera e.g. in accordance with the above-referenced pose estimation and self calibration references. Conventional synthetic image generation methods are described in Foley, J. D. et al, *Fundamentals of interactive computer graphics*, 2nd Edition, Addison-Wesley Publishing, 1990.

Figure 16:
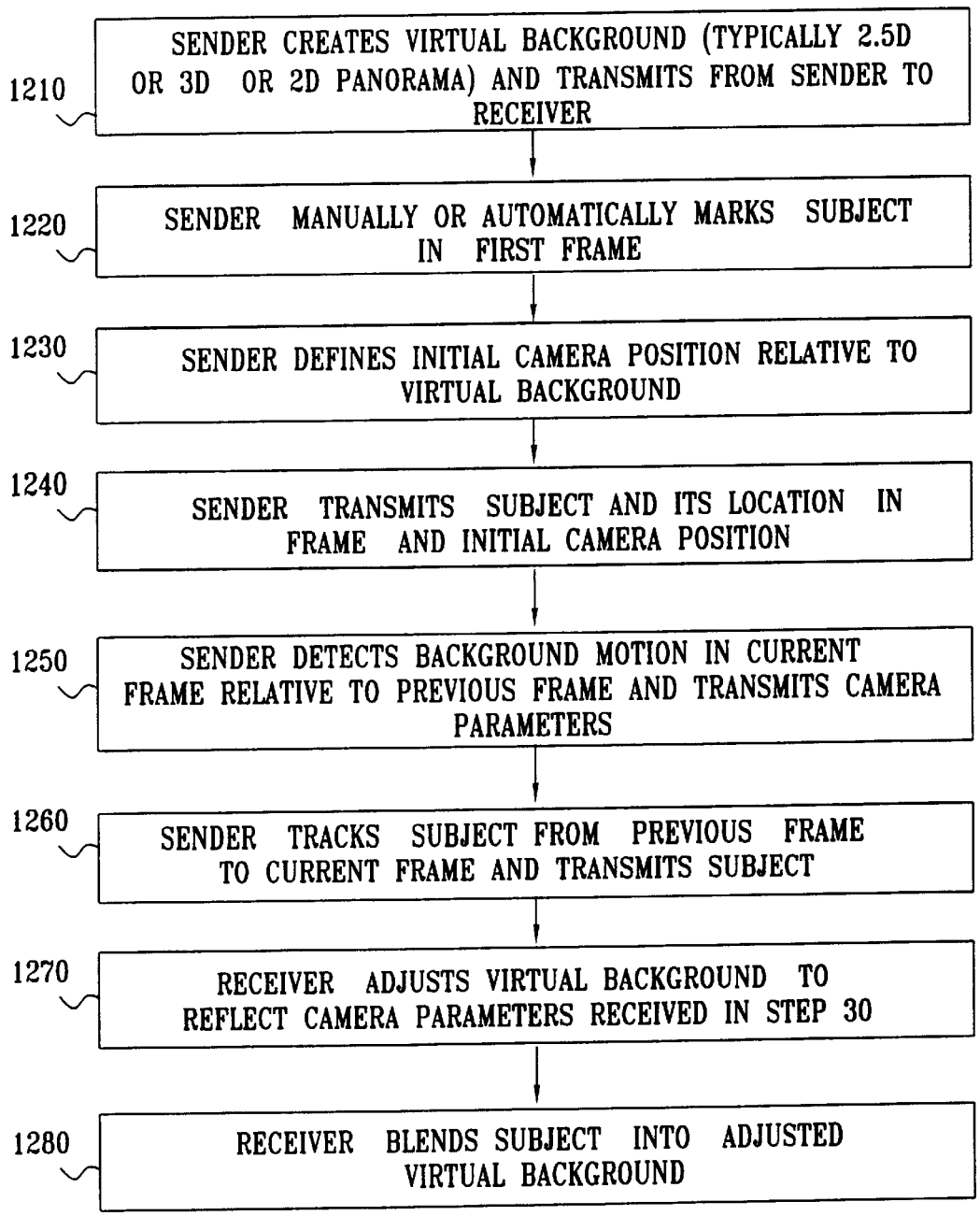
FIG. 16 is a simplified flowchart illustration of a preferred method for transmitting a video-conferencing or chat image with background replacement.
Figure 17:
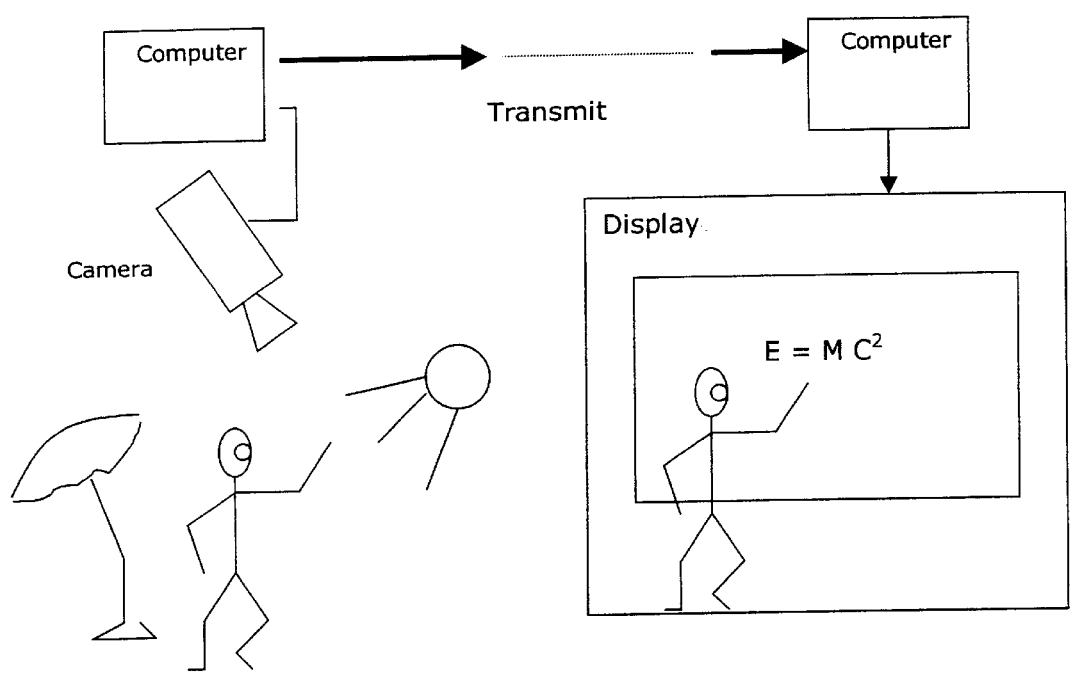
FIG. 17 is a simplified block diagram illustration of apparatus suitable for implementing the method of FIG. 16.

FIG. 16 is a simplified flowchart illustration of a preferred method for transmitting a video-conferencing or chat image with background replacement. FIG. 17 is a simplified block diagram illustration of apparatus suitable for implementing the method of FIG. 16. As shown, a camera is connected to a sender's computer which is operative to perform some or all of the following operations:

a. Create, or select from a database, a new background;
b. Create, or select from the database, a new foreground;
c. Decide on an initial virtual setting;
d. Transmit some or all of (a) to (c) to a second, receiving computer;
e. Detect the foreground, either manually, automatically or by any suitable combination of manual and automatic techniques;
f. For each frame, compute the camera's motion and change in internal parameters; distinguish foreground from background e.g. by tracking the previous foreground; if the foreground is being replaced, tracking the 3D motion of the foreground character; and transmit the foreground (if not to be replace) and results of some or all of the above computations, e.g. camera parameters, which results are typically of extremely small volume.
g. The second, receiving computer sets the virtual camera according to the transmitted camera parameters.
h. If the foreground is replaced, the new replacement is computed according to the model and the transmitted parameters; and
i. The new background and new or old foreground are merged.

The roles of the sending and receiving computers can be reversed if a camera is connected to the second computer and a display is connected to the first computer.

EXAMPLE 2

FIGS. 18A, 18B and 18C illustrate a stationary figure appearing on a stationary background, the figure and background being imaged by a pivoting camera pivoting from azimuthal positions A to B to C respectively.

FIG. 18D is a background panorama from which is to be derived new background content to replace the backgrounds of FIGS. 18A, 18B and 18C. Three azimuthal positions are marked on the panorama of FIG. 18D by dotted lines. The first position, A, is arbitrarily positioned. The second and third positions, B, are positioned relative to position A as dictated by the relative positioning of the camera derived from FIGS. 18B and 18C, relative to FIG. 18A.

It is appreciated that the new background content employed in this example is stationary, and only appears to be in motion due to the camera's motion. Alternatively, as in Example 1, the new background content may be dynamic, e.g. a waterfall scenario, and the new dynamic background content may be imaged by a fixed or moving camera.

Figure 18E:
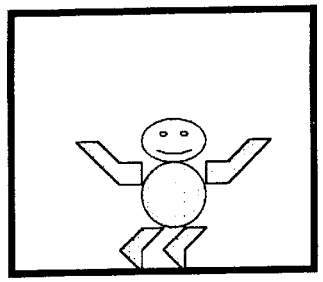
FIGS. 18E, 18F and 18G illustrate the stationary figure of FIGS. 18A, 18B and 18C, respectively, with the original background excised.
Figure 18F:
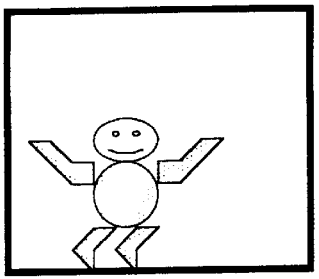

FIGS. 18E, 18F and 18C illustrate the stationary figure of FIGS. 18A, 18B and 18C, respectively, with the original background excised.

Figure 18G:
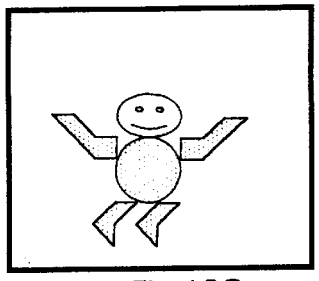
Figure 18H:
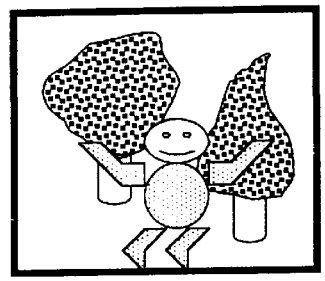
FIGS. 18H, 18I and 18J are merges of the stationary figure of FIGS. 18E, 18F and 18G respectively, merged with the three shots of the panorama of FIG. 18D, corresponding to the azimuthal positions of FIGS. 18A, 18B and 18C respectively.
Figure 18I:
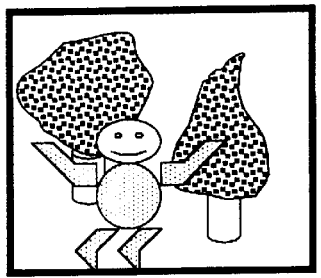
Figure 18J:
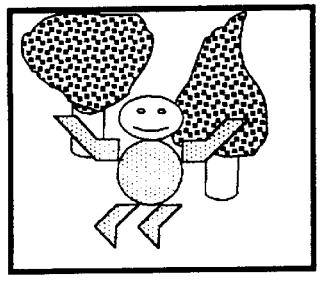

FIGS. 18H, 18I and 18J are merges of the stationary figure of FIGS. 18E, 18F and 18G respectively, merged with the three shots of the panorama of FIG. 18D, corresponding to the azimuthal positions of FIGS. 18A, 18B and 18C respectively.

Figure 18K:
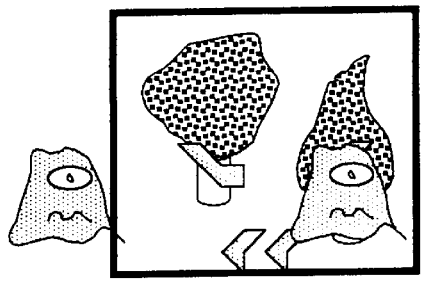
FIGS. 18K, 18L and 18M are similar to FIGS. 18H, 18I and 18J respectively except that the boy is replaced by a creature.
Figure 18L:
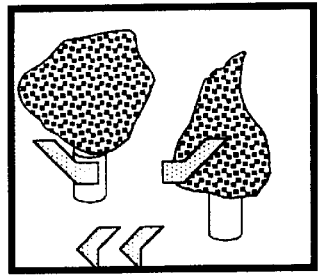
Figure 18M:
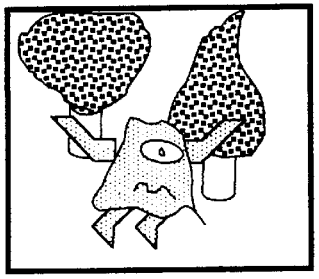

FIGS. 18K, 18L and 18M are similar to FIGS. 18H, 18I and 18J respectively except that the boy is replaced by a creature. The orientations at which the boy is seen in FIGS. 18H, 18I and 18J are the same as those at which the creature is seen in FIGS. 18K, 18L and 18M.

According to a preferred embodiment of the present invention, any moving object can be considered the foreground subject and other moving objects can, if desired, or depending on the application, be treated as background to be replaced. The subject may or may not move and the imaging camera also may or may not move.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for registration between first and second images, the method comprising:
   for each individual location from among a plurality of locations sparsely distributed over the first image, defining a local probability matrix in which each element represents the probability of a possible displacement between said individual location in the first image and its corresponding location within the second image;
   defining a combined probability matrix by combining corresponding elements over the plurality of probability matrices; and
   computing an alignment of the first and second images in accordance with a combination of at least one of the largest of the elements of the combined probability matrix.

2. A method according to claim 1 wherein the corresponding elements which are combined in said combined probability matrix defining step comprise elements within the local probability matrices which are similarly positioned if each individual local probability matrix is shifted to represent the effect on the individual location corresponding to the individual matrix, of a particular non-translational transformation between the first and second images.

3. A method according to claim 2 and also comprising repeating said combined probability matrix defining step for each of a plurality of possible non-translational transformations between the first and second images; and
   selecting at least one most likely non-translational transformation from among said plurality of possible non-translational transformations; and
   wherein said step of computing an alignment comprises computing a relative non-translational transformation of the first and second images by computing a combination of said at least one most likely non-translational transformation; and computing a relative translation of the first and second images by computing a combination of at least one of the largest of the elements of the at least one combined probability matrices of the at least one most likely non-translational transformations.

4. A method according to claim 3 wherein said step of selecting at least one most likely non-translational transformations from among said plurality of possible non-translational transformations includes:

comparing a set of at least one of the largest of the elements in each of the combined probability matrices of each of the plurality of possible non-translational transformations;

selecting at least one set from among the compared sets whose members are largest; and selecting as most likely non-translational transformations, the at least one non-translational transformation corresponding to said at least one set whose members are largest.

5. A method according to claim 1 wherein the probability matrix is characterized in that each i,j element therewithin represents the probabilities that the individual point corresponds to an individual point in the second image, which is displaced correspondingly to the displacement of the i,j element from the center of the probability matrix.

6. A method according to claim 1 wherein the corresponding elements which are combined comprise similarly positioned elements within the local probability matrices.

7. A method according to claim 1 and also comprising executing said alignment.

8. A method according to claim 3 and also comprising executing said alignment by effecting said relative non-translational transformation and said relative translation of the first and second images.

9. A method according to claim 3 wherein said plurality of possible non-translational transformations between the first and second images includes at least one relative rotation between the first and second images.

10. A method according to claim 3 wherein said plurality of possible non-translational transformations between the first and second images includes at least one relative zoom between the first and second images.

11. A method according to claim 3 wherein said plurality of possible non-translational transformations between the first and second images includes at least one transformation which comprises a combination of zoom and rotation between the first and second images.

12. A method according to claim 3 wherein said plurality of possible non-translational transformations between the first and second images includes at least one non-translational affine transformation between the first and second images.

13. A method for detecting motion within a scene by comparing first and second time-separated images of the scene, the method comprising:

for each individual location from among a plurality of locations distributed over the first image, defining a local probability matrix in which each element represents the probability of a possible displacement between said individual location in the first image, representing an individual portion of the scene in the first image, and its corresponding location within the second image; and ranking the local probability matrices into a plurality of ranks of matrices, differing in the probability that the individual location corresponding to a matrix belonging to a rank was displaced between the first and second images, relative to what is known regarding camera motion between the first and second images.

14. A method according to claim 13 wherein said ranking step comprises comparing the center region of each local probability matrix to the peripheral regions thereof.

15. A method according to claim 13 wherein said ranking step comprises:

constructing a combined probability matrix in which each element represents the probability of a possible camera motion-caused displacement between said first image and said second image; and ranking the local probability matrices in accordance with the degree to which they respectively resemble said combined probability matrix.

16. A method according to claim 13 and also comprising deriving the second image from a third image of the scene, separated in time from the first image of the scene, including:

selecting a transformation which, when applied to the third image, results in an image similar to said first image; and applying the transformation to the third image, thereby to derive the second image.

17. A method according to claim 16 wherein said transformation has a non-translational component.

18. A method according to claim 16 wherein said transformation having a non-translational component comprises a non-translational transformation.

19. A system for registration between first and second images, the system comprising:

a local probability matrix generator operative to define, for each individual location from among a plurality of locations sparsely distributed over the first image, a local probability matrix in which each element represents the probability of a possible displacement between said individual location in the first image and its corresponding location within the second image;

a combined probability matrix generator defining a combined probability matrix by combining corresponding elements over the plurality of probability matrices; and an image aligner computing an alignment of the first and second images in accordance with a combination of at least one of the largest of the elements of the combined probability matrix.

20. A system for detecting motion within a scene by comparing first and second time-separated images of the scene, the system comprising:

a local probability matrix generator defining, for each individual location from among a plurality of locations distributed over the first image, a local probability matrix in which each element represents the probability of a possible displacement between said individual location in the first image, representing an individual portion of the scene in the first image, and its corresponding location within the second image; and a location displacement evaluation unit operative to rank the local probability matrices into a plurality of ranks of matrices, differing in the probability that the individual location corresponding to a matrix belonging to a rank was displaced between the first and second images, relative to what is known regarding camera motion between the first and second images.

21. A method for registration between first and second images, the method comprising:

for each individual location from among a plurality of locations sparsely distributed over the first image, defining a local displacement score matrix in which each element's position within the matrix corresponds to a possible displacement between the first and second images, relative to an apriori model of registration between the first and second images and wherein each element in the matrix comprises a score representing the extent to which the individual location in the first image resembles a corresponding location within the second image to which the individual location in the first image is translated under the possible displacement;

defining a combined displacement score matrix by combining corresponding elements over the plurality of local displacement score matrices; and computing an alignment of the first and second images in accordance with a combination of at least one of the largest of the elements of the combined displacement score matrix.

22. A system for registration between first and second images, the system comprising:

a local displacement score matrix generator operative to define, for each individual location from among a plurality of locations sparsely distributed over the first image, a local displacement score matrix in which each element's position within the matrix corresponds to a possible displacement between the first and second images, relative to an apriori model of registration between the first and second images and wherein each element in the matrix comprises a score representing the extent to which the individual location in the first image resembles a corresponding location within the second image to which the individual location in the first image is translated under the possible displacement;

a combined displacement score matrix generator operative to combine corresponding elements over the plurality of local displacement score matrices; and an aligner operative to compute an alignment of the first and second images in accordance with a combination of at least one of the largest of the elements of the combined displacement score matrix.

* * * * *